United States Patent
Park et al.

(10) Patent No.: US 9,977,439 B2
(45) Date of Patent: *May 22, 2018

(54) ENERGY EFFICIENCY AWARE THERMAL MANAGEMENT IN A MULTI-PROCESSOR SYSTEM ON A CHIP

(71) Applicant: QUALCOMM INCORPORATED, San Diego, CA (US)

(72) Inventors: Hee Jun Park, San Diego, CA (US); Young Hoon Kang, San Diego, CA (US); Ronald Frank Alton, Oceanside, CA (US); Christopher Lee Medrano, Longmont, CO (US); Jon James Anderson, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

This patent is subject to a terminal disclaimer.

(21) Appl. No.: 14/280,630

(22) Filed: May 18, 2014

(65) Prior Publication Data

US 2015/0286225 A1  Oct. 8, 2015

Related U.S. Application Data

(60) Provisional application No. 61/977,013, filed on Apr. 8, 2014, provisional application No. 61/981,714, filed on Apr. 18, 2014.

(51) Int. Cl.
*G05B 15/02* (2006.01)
*G05D 23/19* (2006.01)
(Continued)

(52) U.S. Cl.
CPC ......... *G05D 23/1917* (2013.01); *G05B 15/02* (2013.01); *G06F 1/203* (2013.01);
(Continued)

(58) Field of Classification Search
CPC ..... G05D 23/1917; G05B 15/02; G06F 11/30; G06F 11/34; G06F 1/203; G06F 1/206;
(Continued)

(56) References Cited

U.S. PATENT DOCUMENTS

| | | |
|---|---|---|
| 5,623,647 A | 4/1997 | Maitra |
| 6,415,388 B1 | 7/2002 | Browning et al. |

(Continued)

FOREIGN PATENT DOCUMENTS

| | | |
|---|---|---|
| JP | 2004303206 A | 10/2004 |
| JP | 2009522688 A | 6/2009 |

(Continued)

OTHER PUBLICATIONS

Boehman B., "Advanced Power Management Brings Improved Performance to Highly Integrated x86 Processors," RTC Magazine on Dec. 2013, pp. 5.

(Continued)

*Primary Examiner* — Yuhui R Pan
(74) *Attorney, Agent, or Firm* — Smith Tempel Blaha LLC

(57) ABSTRACT

Various embodiments of methods and systems for energy efficiency aware thermal management in a portable computing device that contains a heterogeneous, multi-processor system on a chip ("SoC") are disclosed. Because individual processing components in a heterogeneous, multi-processor SoC may exhibit different processing efficiencies at a given temperature, energy efficiency aware thermal management techniques that compare performance data of the individual processing components at their measured operating temperatures can be leveraged to optimize quality of service ("QoS") by adjusting the power supplies to, reallocating workloads away from, or transitioning the power mode of, the least energy efficient processing components. In these (Continued)

ways, embodiments of the solution optimize the average amount of power consumed across the SoC to process a MIPS of workload.

30 Claims, 16 Drawing Sheets

(51) Int. Cl.
  *G06F 1/20* (2006.01)
  *G06F 1/32* (2006.01)
  *G06F 1/26* (2006.01)
  G06F 11/30 (2006.01)
  G06F 11/34 (2006.01)

(52) U.S. Cl.
  CPC ............... *G06F 1/206* (2013.01); *G06F 1/26* (2013.01); *G06F 1/324* (2013.01); *G06F 1/3206* (2013.01); *G06F 1/3296* (2013.01); G06F 11/30 (2013.01); G06F 11/34 (2013.01); Y02B 60/1275 (2013.01); Y02D 10/16 (2018.01)

(58) Field of Classification Search
  CPC .......... G06F 1/26; G06F 1/3206; G06F 1/324; G06F 1/3296; Y02B 60/1275
  USPC .................................................. 700/276, 299
  See application file for complete search history.

(56) References Cited

U.S. PATENT DOCUMENTS

| | | |
|---|---|---|
| 6,442,700 B1 | 8/2002 | Cooper |
| 6,557,072 B2 | 4/2003 | Osborn |
| 6,938,176 B1 | 8/2005 | Alben et al. |
| 7,003,409 B2 | 2/2006 | Hepner et al. |
| 7,036,030 B1 | 4/2006 | Altmejd |
| 7,093,147 B2* | 8/2006 | Farkas .................. G06F 1/3203 713/320 |
| 7,096,145 B2 | 8/2006 | Orenstien et al. |
| 7,141,953 B2 | 11/2006 | Cohen et al. |
| 7,451,333 B2* | 11/2008 | Naveh .................. G06F 1/3203 713/323 |
| 7,793,125 B2 | 9/2010 | Berry, Jr. et al. |
| 8,214,660 B2 | 7/2012 | Capps, Jr. et al. |
| 8,281,160 B1 | 10/2012 | Bai et al. |
| 8,312,460 B1 | 11/2012 | Blanding |
| 8,359,597 B1* | 1/2013 | John .................. G06F 9/5044 706/25 |
| 8,429,431 B2 | 4/2013 | Malik et al. |
| 8,429,441 B2 | 4/2013 | Baker et al. |
| 8,484,496 B2 | 7/2013 | Anderson et al. |
| 8,601,300 B2 | 12/2013 | Anderson et al. |
| 8,775,830 B2 | 7/2014 | Sur et al. |
| 9,170,626 B2 | 10/2015 | Cline et al. |
| 9,292,293 B2 | 3/2016 | Park et al. |
| 2003/0126479 A1 | 7/2003 | Burns et al. |
| 2003/0206050 A1 | 11/2003 | Huard et al. |
| 2004/0132503 A1* | 7/2004 | Chiu ........................ G06F 1/203 455/575.1 |
| 2006/0095913 A1 | 5/2006 | Bodas et al. |
| 2007/0156370 A1 | 7/2007 | White et al. |
| 2008/0022140 A1 | 1/2008 | Yamada et al. |
| 2008/0077282 A1 | 3/2008 | Hartman et al. |
| 2008/0077348 A1 | 3/2008 | Hildebrand et al. |
| 2008/0115010 A1* | 5/2008 | Rothman ................. G06F 1/206 714/10 |
| 2009/0106576 A1 | 4/2009 | Jacobowitz et al. |
| 2009/0158061 A1 | 6/2009 | Schmitz et al. |
| 2009/0290625 A1 | 11/2009 | Riddle et al. |
| 2010/0058078 A1* | 3/2010 | Branover .............. G06F 1/3203 713/300 |
| 2010/0153954 A1 | 6/2010 | Morrow et al. |
| 2011/0055603 A1 | 3/2011 | Wolfe |
| 2011/0191603 A1 | 8/2011 | Cher et al. |
| 2012/0066439 A1 | 3/2012 | Fillingim |
| 2012/0110352 A1 | 5/2012 | Branover et al. |
| 2012/0166839 A1 | 6/2012 | Sodhi et al. |
| 2012/0233477 A1 | 9/2012 | Wu et al. |
| 2012/0271481 A1 | 10/2012 | Anderson et al. |
| 2012/0311357 A1* | 12/2012 | Andrews ................. G06F 1/206 713/320 |
| 2012/0324248 A1 | 12/2012 | Schluessler et al. |
| 2013/0013126 A1 | 1/2013 | Salsbery et al. |
| 2013/0019120 A1 | 1/2013 | Salsbery et al. |
| 2013/0073875 A1* | 3/2013 | Anderson ............. G06F 1/3293 713/300 |
| 2013/0132972 A1 | 5/2013 | Sur et al. |
| 2013/0151891 A1 | 6/2013 | Piry et al. |
| 2013/0185570 A1 | 7/2013 | Kumar et al. |
| 2013/0232360 A1 | 9/2013 | Chen et al. |
| 2013/0318379 A1 | 11/2013 | Seshadri et al. |
| 2014/0006818 A1 | 1/2014 | Doshi et al. |
| 2014/0075222 A1 | 3/2014 | Jackson |
| 2014/0108828 A1 | 4/2014 | Breternitz et al. |
| 2014/0281445 A1 | 9/2014 | Varma et al. |
| 2014/0317427 A1 | 10/2014 | Hill |
| 2015/0194969 A1 | 7/2015 | Kawabe et al. |
| 2015/0286257 A1 | 10/2015 | Park et al. |
| 2015/0286262 A1 | 10/2015 | Park et al. |

FOREIGN PATENT DOCUMENTS

| | | |
|---|---|---|
| JP | 2013513169 A | 4/2013 |
| WO | WO-0026747 A1 | 5/2000 |
| WO | 2009125789 A1 | 10/2009 |
| WO | 2011084335 A1 | 7/2011 |

OTHER PUBLICATIONS

International Search Report and Written Opinion—PCT/US2015/024845—ISA/EPO—dated Jul. 28, 2015.
Zhang Y., et al., "Towards Better CPU Power Management on Multicore Smartphones," HotPower '13 Proceedings of the Workshop on Power-Aware Computing and Systems, 2013, pp. 5.

* cited by examiner

ENERGY EFFICIENCY AWARE THERMAL MANAGEMENT IN A MULTI-PROCESSOR SYSTEM ON A CHIP

STATEMENT REGARDING RELATED APPLICATIONS

This application claims priority under 35 U.S.C. § 119 as a non-provisional application of U.S. Provisional Patent Application 61/977,013 filed on Apr. 8, 2014 and entitled SYSTEM AND METHOD FOR THERMAL MITIGATION IN A SYSTEM ON A CHIP, the entire contents of which is hereby incorporated by reference. This application also claims priority under 35 U.S.C. § 119 as a non-provisional application of U.S. Provisional Patent Application 61/981,714 filed on Apr. 18, 2014 and entitled ENERGY EFFICIENCY AWARE THERMAL MANAGEMENT IN A HETEROGENEOUS MULTI-PROCESSOR SYSTEM ON A CHIP, the entire contents of which is hereby incorporated by reference. This application is related to two non-provisional applications both entitled ENERGY EFFICIENCY AWARE THERMAL MANAGEMENT IN A MULTI-PROCESSOR SYSTEM ON A CHIP filed in the United States Patent and Trademark Office on May 18, 2014, the entire contents of both applications are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs are typically limited in size and, therefore, room for components within a PCD often comes at a premium. As such, there often is not enough space within a typical PCD form factor for engineers and designers to mitigate thermal degradation or thermal failure of components through clever spatial arrangements or placement of passive cooling components. Consequently, thermal energy generation is often managed in a PCD through the application of various thermal management techniques that may include wilting or shutting down electronics at the expense of performance.

Thermal management techniques are employed within a PCD in an effort to seek a balance between mitigating thermal energy generation and impacting the quality of service ("QoS") provided by the PCD. In a PCD that has heterogeneous processing components, the ramifications of balancing that tradeoff can be difficult to manage because the various processing components within the PCD are not created equal. As such, thermal mitigation measures known in the art which, in response to a thermal trigger, uniformly limit power frequency to all processing components equally, or simply limit the power supply voltage and clock generator frequency to the hottest processing component, often fail to optimize a QoS level in trade for a reduced rate of thermal energy generation. Because various processing components in a system on a chip ("SoC"), whether homogenous or heterogeneous in design, inevitably vary in performance abilities, it is not always the hottest processing component that offers the most potential for thermal energy reduction when measured against an impact on QoS.

Accordingly, what is needed in the art is a method and system for energy efficiency aware thermal mitigation. Further, what is needed in the art is a system and method for comparing processing components and identifying the least, and most, efficient processing components.

SUMMARY OF THE DISCLOSURE

Various embodiments of methods and systems for energy efficiency aware thermal management in a portable computing device that contains a synchronous multi-processor system on a chip ("SoC") are disclosed. Because individual processing components may have different characteristics either by intended designs or from manufacturing process variation, multi-processor SoC may exhibit different processing efficiencies at a given temperature, energy efficiency aware thermal management techniques that compare performance data of the individual processing components at their measured operating temperatures can be leveraged to maximize performance under power and thermal constraints by allocating and/or reallocating workloads away from the least energy efficient processing components. Embodiments may not simply seek to prevent a workload from running on a core that is less energy efficient. That is, in some embodiments, when a workload starts the system may consider the energy efficiency of each component and place the workload on the most efficient CPU that the workload fits on. For example, if the most efficient core is already too heavily utilized then the next most efficient core may be selected. In these ways, embodiments of the solution optimize the average amount of power consumed across the SoC to process a known workload.

One such method involves monitoring temperature readings uniquely associated with each of a plurality of individual processing components in the heterogeneous or homogeneous, multi-processor SoC. Because the SoC has a synchronous architecture, the plurality of processing components share a common power supply and clock generator. A thermal parameter is monitored and an alarm is received indicating that a threshold associated with the thermal parameter has been exceeded. The monitored temperature readings uniquely associated with each of the processing components are then sampled. Based on the sampled temperature readings, performance data for each processing component is queried. The performance data represents the relationship between power consumption and workload processing capability for a given individual processing component when operating at a given temperature. Then, the performance data for the processing components are compared to identify a least energy efficient processing component. Once the least energy efficient processing component is identified, its workload may be reallocated to a more efficient processing component. Advantageously, shifting workload from a less energy efficient processing component to a more energy efficient processing component reduces the power consumption by the least energy efficient processing component, thereby optimizing the overall processing efficiency of the SoC.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1A:
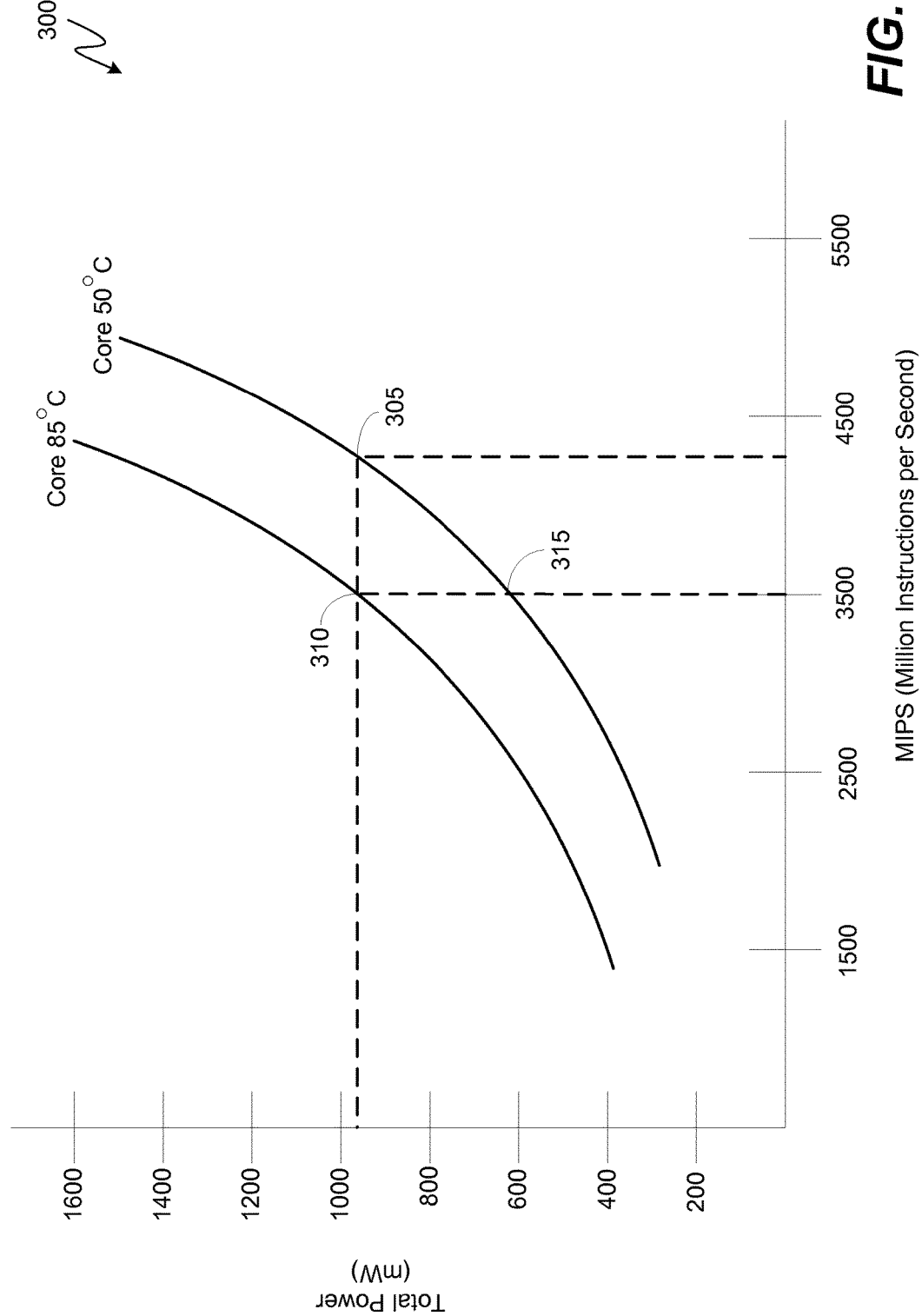
FIG. 1A is a graph illustrating a pair of performance curves of an exemplary processing component operating under different thermal conditions.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "thermal aggressor," "processing engine" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are non-limiting examples of processing components that may reside in a PCD and are used interchangeably except when otherwise indicated. Moreover, as distinguished in this description, a CPU, DSP, or a chip may be comprised of one or more distinct processing components generally referred to herein as "core(s)" and "sub-core(s)."

In this description, "heterogeneous components" includes components different in their intended design as well as components with homogeneous design (same by design) but having different electrical characteristics due to production variation, temperature during operation, and the component location on the silicon die. One of ordinary skill in the art will understand that even in the case that processing components are homogeneous in design, the electrical characteristics of each processing component on an SOC will vary (be different from each other) due to one or more of silicon leakage production variation, switching speed production variation, dynamic temperature changes during operation in each component, and the component location on the silicon die. As such, one of ordinary skill in the art will recognize that components on a SOC may not be perfectly homogeneous and identical from power and performance perspectives.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload" and "block of code" are used interchangeably and generally directed toward the processing burden, or percentage of processing burden, that is associated with, or may be assigned to, a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management" and "thermal mitigation measure(s)" are used interchangeably.

One of ordinary skill in the art will recognize that the term "DMIPS" represents the number of Dhrystone iterations required to process a given number of millions of instructions per second. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating.

In this description, the term "portable computing device" ("PCD") is used to describe any device operating on a limited capacity power supply voltage and clock generator frequency, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing processing performance for QoS optimization in a PCD that has a heterogeneous processing component(s) can be accomplished by leveraging the diverse performance characteristics of the individual processing engines. Even in the case the processing components are homogeneous in design, the electrical characteristics of each processing component on an SOC may vary (be different from each other) due to any number of factors including, but not limited to, silicon leakage production variation, switching speed production variation, dynamic temperature changes during operation in each component, and the component location on the silicon die. As such, one of ordinary skill in the art will recognize that components on the SOC may not be perfectly homogeneous and identical from power and performance perspectives. In this disclosure, therefore, it will be understood that reference to "heterogeneous components" also means components with homogeneous design (same by design) but having different electrical characteristics due to production variation, temperature during operation, and the component location on the silicon die. With regards to the diverse performance characteristics of various processing engines that may be included in a heterogeneous processing component, one of ordinary skill in the art will recognize that performance differences may be attributable to any number of reasons including, but not limited to, differing levels of silicon, design variations, etc. Moreover, one of ordinary skill in the art will recognize that the performance characteristics associated with any given processing component may vary in relation with the operating temperature of that processing component, the power supplied to that processing component, etc.

For instance, consider an exemplary heterogeneous multicore processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low performance to medium performance processing core within the heterogeneous processor will exhibit a lower power leakage rate at a given workload capacity, and consequently a lower rate of thermal energy generation, than a processing core having a relatively high performance capacity. The higher capacity core may be capable of processing a given workload in a shorter amount of time than a lower capacity core. Similarly, a high capacity core with a processing speed that has been wilted may exhibit a lower power leakage rate at a given workload capacity, and consequently a lower rate of thermal energy generation, than when processing at its full, unchecked capacity.

Even so, depending on the thermal conditions under which the cores may be operating, the lower performance core may be more, or less, efficient (in power consumption) at processing the given workload than a high performance core. Moreover, the "hottest" core may also be the least energy efficient core at any given time, but such is not necessarily the case in all scenarios. As such, in order to realize the greatest return in thermal energy mitigation for sacrificed processing capacity, embodiments of energy efficiency aware thermal management solutions make thermal management decisions in light of the relative processing efficiencies among the various processing components as opposed to the relative temperatures.

Notably, the processing efficiency of a given processing component may be viewed as a power efficiency ratio represented by operating frequency/power consumption. Alternatively, the power efficiency may be represented by a known workload, for example DMIPS, the efficiency ratio may be represented by that known workload/power consumption. Once the processing efficiencies of the various processing components are determined, a dynamic control and voltage scaling ("DCVS") algorithm, as is generally understood in the art, may be leveraged to adjust the power frequency supplied to a least energy efficient processing component so that thermal energy generation is mitigated with minimal impact to the overall amount of workload that may be processed by the SoC.

By considering the individual performance characteristics (or indicators of performance characteristics such as, but not limited to, electrical current draw) of the diverse cores within the heterogeneous processor, where the performance characteristics may be used to deduce the power consumed by a given core at a given operating temperature in order to process a given workload, an energy efficiency aware thermal management algorithm may dictate that a least energy efficient core (not necessarily the "hottest" core) be "dialed down" in order to reduce thermal energy generation with minimal impact to the overall QoS. Similarly, in response to a need to reduce thermal energy generation, an energy efficiency aware thermal management algorithm may cause active workloads to be reallocated from a less efficient core to a more efficient core, or dictate that queued workloads be allocated to more efficient cores with available capacity. Notably, embodiments of the solution may not simply seek to prevent a workload from running on a core that is less energy efficient. That is, in some embodiments, when a workload starts the system may consider the energy efficiency of each component and place the workload on the most efficient CPU that the workload fits on. For example, if the most efficient core is already too heavily utilized then the next most efficient core may be selected. In these ways, and other ways, embodiments of energy efficiency aware thermal management solutions may manage thermal energy generation in a PCD while optimizing the overall QoS level experienced by a user.

As a non-limiting example, a monitored thermal threshold in a PCD may be exceeded to trigger a thermal alarm. A thermal threshold may be associated with, but is not limited to being associated with, a "skin" temperature of a PCD, a temperature of a package on package ("PoP") memory device, a junction temperature of a core, a power supply and clock generator capacity, a use case scenario, etc. Recognizing that the thermal threshold has been exceeded, an efficiency manager module for facilitating energy efficiency aware thermal management policies may seek to reduce power consumption by one or more processing components. Advantageously, by reducing the power consumption, thermal energy generation may be mitigated and the thermal alarm cleared. After the thermal alarm has cleared, certain embodiments of energy efficiency aware thermal management solutions may authorize an increase in the power supply voltage and clock generator frequency of a less efficient processing component that was previously the recipient of a reduced power supply voltage and clock generator frequency. Similarly, after the thermal alarm has cleared, certain embodiments of energy efficiency aware thermal management solutions may authorize a return to an active power mode for a less efficient processing component that was previously the recipient of a transitioned power mode.

The efficiency manager module may query performance data associated with various processing components, or receive measurements indicative of processor performance, and determine which one or more of active and thermally aggressive processing components are the least energy efficient at processing workloads. That is, the efficiency manager module may determine which processing components consume the most power of a known workload to be processed. Based on the determination, the efficiency manager module may then cause the power supplied to the least energy efficient processing component(s) to be reduced, thereby mitigating the overall thermal energy generation of the plurality of processing components without unnecessarily sacrificing the average amount of workload that may be processed per milliwatt ("mW") power consumed. In this way, the efficiency manager module may optimize QoS while satisfying a need to reduce thermal energy generation.

As another non-limiting example, a particular block of code may be processed by either of a central processing unit ("CPU") or a graphical processing unit ("GPU") within an exemplary PCD. The particular block of code may be assigned for processing by the CPU, for example. An efficiency manager module of an exemplary embodiment of the solution, however, may determine that the GPU is in a position to more efficiently process the block of code and, in response to the determination, cause the block of code to be reallocated from the CPU to the GPU. In this way, the amount of energy required to process the block of code may be minimized and, as a result, the overall thermal energy generation of the SoC minimized.

As another non-limiting example, a particular block of code may be processed by either of a central processing unit ("CPU") or a graphical processing unit ("GPU") within an exemplary PCD. Advantageously, instead of predetermining that the particular block of code will be processed by one of the CPU or GPU, an exemplary embodiment may select which of the processing components will be assigned the task of processing the block of code as the need for processing the code ripens. That is, a "snap shot" of the performance curves of the CPU and GPU may be compared so that the processor best equipped to efficiently process the block of code is assigned the workload. Notably, it will be understood that subsequent processor selections for allocation of subsequent workloads may be made in real time, or near real time, as the blocks of code exit a scheduling queue. In this way, an efficiency management module may leverage operating temperatures associated with individual cores in a heterogeneous processor to optimize QoS by selecting processing cores just prior to workload allocation.

FIG. 1A is a graph 300 illustrating a pair of performance curves (Core 85° C., Core 50° C.) of an exemplary processing component operating under different thermal conditions. The processing component may be a core within a heterogeneous multi-core processor and may be a high efficiency, medium efficiency or low efficiency core. More specifically, as one of ordinary skill in the art will acknowledge, the processing component may be any processing engine capable of processing a given block of code including, but not limited to, a CPU, GPU, DSP, programmable array, video encoder/decoder, system bus, camera sub-system (image processor), MDP, etc. Moreover, as described above, the exemplary processing engine may be a core or sub-core within a CPU, GPU, etc. Notably, energy efficiency may be defined to indicate the processing performance or speed of a processing component at a specific power consumption level. For example, energy efficiency may be represented by MIPS/mW (million instructions per second per mW power consumption) or MHz/mW (Mega herz operating clock frequency per mW power consumption).

As can be seen from the FIG. 1A illustration, at a workload of 3500 MIPS the exemplary core operating in a 50° C. environment consumes approximately 620 mW of power (point 315) but, at the same 3500 MIPS workload, the power consumption of the core increases to almost 1000 mW of power (point 310) when the operating environment reaches 85° C. Consequently, the efficiency of the exemplary processing component is better when operating at the 50° C. temperature because it can process approximately 5.6 MIPS/mW, as opposed to 3.5 MIPS/mW when operating at 85° C. Moreover, for a given operating temperature, the processing efficiency of a core decreases with an increase in workload. Referring to the Core 50° C. curve, for example, when the workload is increased from 3500 MIPS to approximately 4300 MIPS, the power consumption increases to almost 1000 mW (point 305).

It can be seen from the FIG. 1A illustration that, for a given processing component, the efficiency of the processing component in terms of power consumption decreases as the operating temperature rises (i.e., as the operating temperature of a processing component increases, the number of MIPS it is capable of processing at a given operating frequency will decrease). Notably, one of ordinary skill in the art will recognize that a rise in operating temperature of an exemplary processing component may be caused by any number of factors or combination of factors including, but not limited to, increased power leakage within the processing component associated with higher clocking speeds, thermal aggressors adjacent to the processing component, malfunctioning components adjacent to the processing component, change of ambient environment, etc. Moreover, one of ordinary skill in the art will recognize that increased workloads on a processing component may cause the operating temperature associated with the processing component at the time of workload allocation to rise as a result of an increased power leakage rate associated with an increase in power consumption. Regardless of why the operating temperature of a processing component may rise or fall, it is important to note from the FIG. 1A illustration that, in general, the processing efficiency of a given processing component decreases inversely with an increase in operating temperature.

Figure 1B:
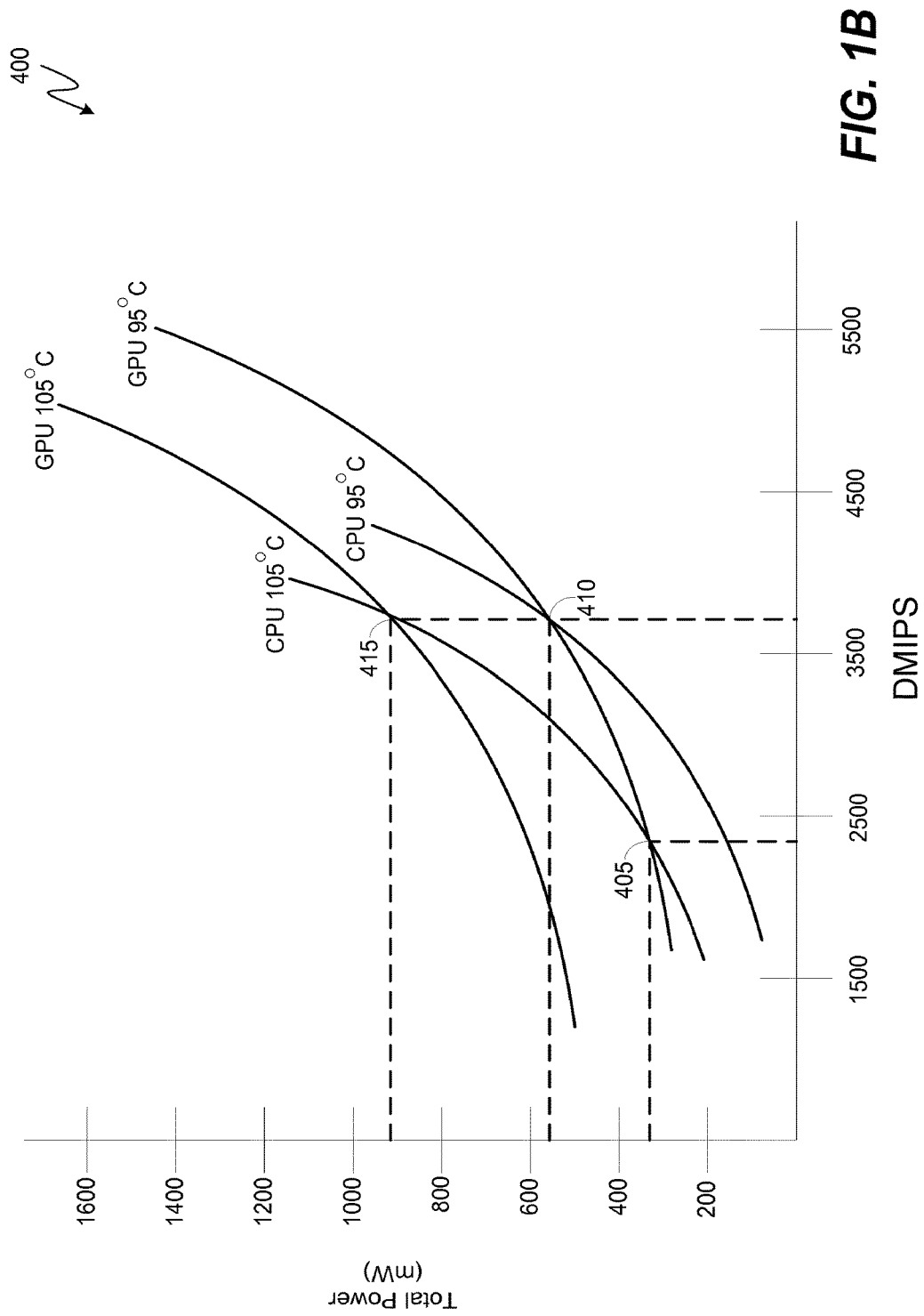
FIG. 1B is a graph illustrating a pair of performance curves for each of two exemplary processing components, a "low performance" CPU processing component and a "high performance" GPU processing component, operating under different thermal conditions.

Turning now to FIG. 1B, a graph 400 illustrating a pair of performance curves (GPU 105° C., GPU 95° C.; CPU 105° C., CPU 95° C.) for each of two exemplary processing components, a "low performance" CPU processing component and a "high performance" GPU processing component, operating under different thermal conditions is depicted. Essentially, the FIG. 1B graph 400 depicts performance curves for two diverse exemplary processing components, each of which may be represented by the FIG. 1A illustration. Moreover, one of ordinary skill in the art will recognize that the two exemplary processors GPU, CPU represented by the performance curve pairs in FIG. 2 may be contained in a common heterogeneous multi-processor system on a chip ("SoC").

Notably, by overlaying the performance curves of the exemplary engines GPU, CPU, it can be seen that various transitions or cross-over points 405, 410, 415 are defined at the intersections of the various curves. These crossover points represent thresholds above and below which different engines are most efficient.

For instance, a comparative analysis of the exemplary GPU, CPU processor performance curves, when each of the processors GPU, CPU are operating at 95° C., can determine that both processors GPU, CPU are substantially equivalent in processing efficiency at a workload of approximately 3700 DMIPS (point 410). It can also be seen from the comparative analysis, however, that the CPU processing component is more efficient below point 410, i.e. the CPU processing component consumes less power per DMIPS workload when the workload is less than 3700 DMIPS. Conversely, the GPU core is more efficient above point 410, i.e. the GPU core consumes less power per DMIPS of workload when the workload exceeds 3700 DMIPS.

Therefore, relying on the exemplary comparative analysis when the CPU is running at 105° C. and the GPU is running at the lower 95° C., an efficiency manager module applying an energy efficiency aware thermal management policy in response to a trigger to reduce overall thermal energy generation may dictate a reduction in power to the less efficient GPU for workloads below point 405 even though the temperature of the CPU is higher.

Moreover, it will be understood that, due to any number of factors, diverse processors and/or cores in a heterogeneous multi-processor SoC may be operating under different thermal conditions. For example, in the FIG. 1B illustration, a transition point 405 represents the intersection of performance curves for the exemplary CPU processing component operating at 105° C. and the exemplary GPU processing component operating at 95° C. Consequently, by recognizing that the exemplary processors are operating at differing temperatures, an embodiment may leverage a comparative analysis to determine which of the processors is best equipped just prior to workload allocation to efficiently process a given block of code ready for processing, similar to the exemplary scenarios described above. For instance, workloads below 2400 DMIPS may be assigned to the CPU processing component, and workloads above 2400 DMIPS assigned to the GPU processing component, in order to ensure that workloads are processed under the most efficient conditions. Moreover, it is envisioned that embodiments of energy efficiency aware thermal management solutions may reallocate workloads among and between processing components such that the overall average efficiency of collective processing engines is optimized. In doing so, certain embodiments may not simply seek to prevent a workload from running on a core that is less energy efficient. That is, in some embodiments, when a workload starts the system may consider the energy efficiency of each component and place the workload on the most efficient CPU that the workload fits on. For example, if the most efficient core is already too heavily utilized then the next most efficient core may be selected.

Notably, it is envisioned that certain embodiments of an energy efficiency aware thermal management algorithm may be executed to optimize overall workload processing efficiency in the event that a next block of code is assigned. For instance, referring back to the exemplary curves GPU 95° C. and CPU 105° C. of the FIG. 1B illustration, suppose that each of the processors GPU, CPU associated with the curves are currently processing at a rate of 2000 DMIPS and an efficiency management module is seeking to determine which of the two exemplary processors is best positioned for efficient processing of an additional workload of 1000 DMIPS. An energy efficiency aware thermal management algorithm may be used to compare the curves based on an assumed aggregate workload of 3000 MIPS per processing component GPU, CPU (2000 MIPS previously allocated per engine plus the additional 1000 MIPS to be allocated to one of the engines), as opposed to the 2000 DMIPS workload currently being processed. For this non-limiting example, based on the exemplary curves GPU 95° C.and CPU 105° C. of the FIG. 1B illustration, the thermally aware scheduling module may select the more efficient GPU which will consume under 400 mW of power to process at 3000 DMIPS as opposed to the CPU which will consume over 500 mW of power at the same workload.

Extending the above example, after assigning the additional 1000 DMIPS to the GPU, the efficiency management module may move to reallocate the 2000 DMIPS of workload running on the CPU to the GPU, thereby further increasing the workload of the GPU from 3000 DMIPS to 5000 DMIPS. Advantageously, at 5000 DMIPS, the GPU will consume 1000 mW of power, or 5 DMIPS/mW, to process the workload as opposed to the roughly 8 DMIPS/mW the CPU would consume if its 2000 DMIPS workload were not reallocated. Moreover, with the workload completely removed from the CPU in the example, it is envisioned that the efficiency manager module may transition the CPU to a retention state or even power collapsed state, thereby further saving energy and mitigating thermal energy generation.

Still other embodiments of an energy efficiency aware thermal management algorithm may be used to compare performance curves based on a predicted shift in the curves should an additional workload be assigned. For instance, referring back to the example of processors GPU and CPU processing at a rate of 2000 DMIPS each at operating temperatures of 95° C. and 105° C., respectively, embodiments of an efficiency management module may predict a shift in the performance curves that could result from the additional 1000 DMIPS workload being allocated. Notably, because the additional 1000 DMIPS workload may cause a processing component to which it is assigned to consume more power, an efficiency management module may consider that the operating temperature presently associated with the processing component will rise as a result of the additional workload and, as such, seek to compare performance curves associated with the predicted temperature rise.

Returning to the example, the additional 1000 DMIPS of workload may cause the operating temperature of the GPU to increase from 95° C. to 100° C. and, similarly, the operating temperature of the CPU to increase from 105° C. to 110° C. Accordingly, an embodiment of an efficiency management module may query and compare performance data associated with the cores GPU and CPU operating at the predicted temperatures of 100° and 110°, respectively (GPU 100° C. and CPU 110° C. performance curves not shown in FIG. 1B).

Figure 1C:
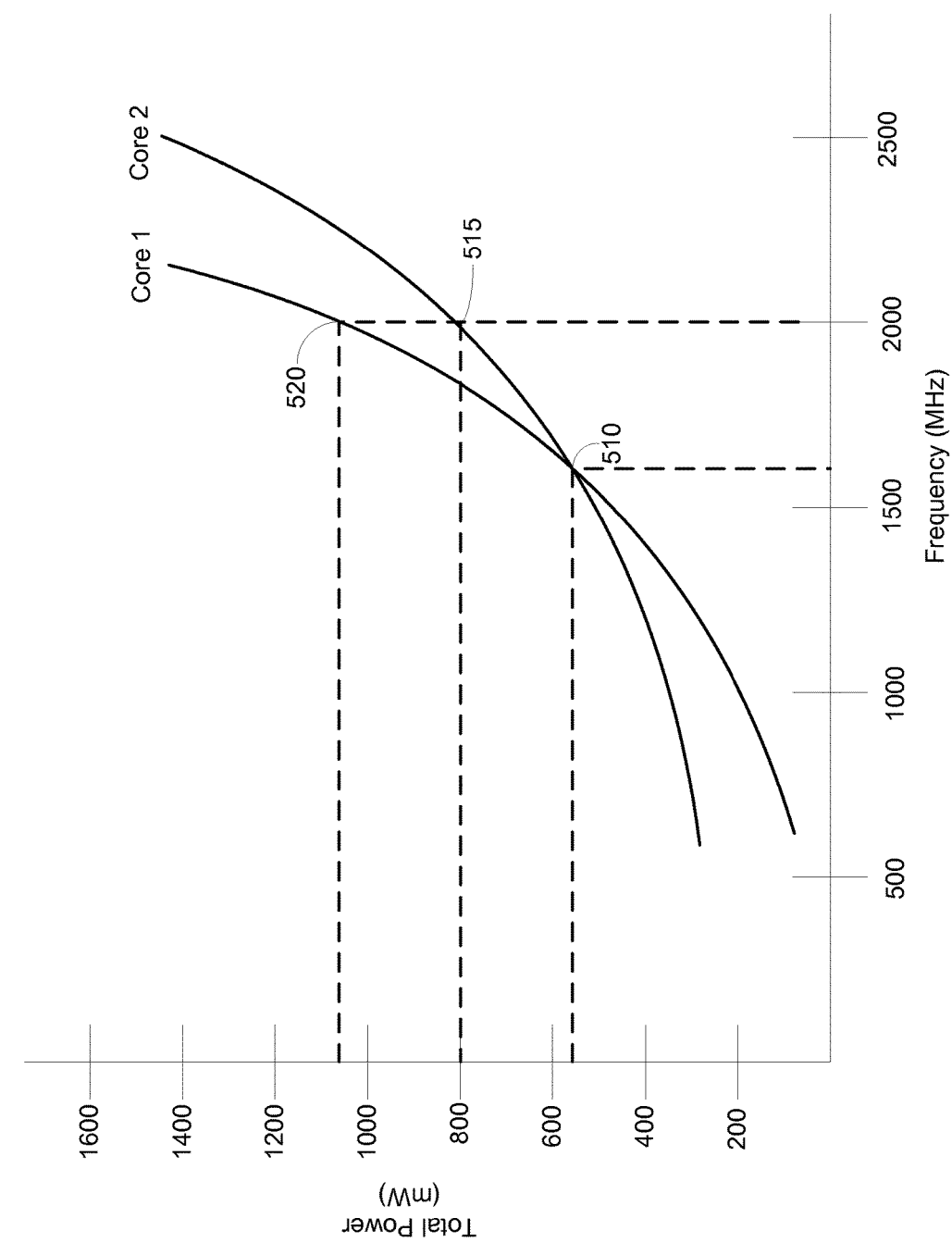
FIG. 1C is a graph illustrating a pair of performance curves for an exemplary pair of cores.

FIG. 1C is a graph 500 illustrating a pair of performance curves for an exemplary pair of cores, Core 1 and Core 2. Core 2 may be viewed as a "faster" core relative to Core 1 that may be viewed as a "slower" core. Notably, one of ordinary skill in the art would recognize Core 2 as the faster core of the exemplary pair because Core 2 is capable of processing at a higher maximum frequency (approximately 2500 MHz) than Core 1 (approximately 2100 MHz). Consequently, and because operating frequency correlates with MIPS, one of ordinary skill in the art would also recognize that Core 2 is capable of processing more MIPS than Core 1.

Point 510 in the FIG. 1C illustration represents a frequency (~1600 MHz) above which the Core 2 is more efficient at processing a MIPS of workload than Core 1 [at 2000 MHz the Core 2 is only consuming ~800 mW of power (point 515) whereas Core 1 is consuming ~1100 mW of power at the same 2000 MHz operating frequency (point 520)]. Notably, however, below point 510 the exemplary Core 1 is the more efficient processor of the two. As such, if both Core 1 and Core 2 were running at frequencies below 1600 MHz and the efficiency management module recognized a trigger to reduce thermal energy generation (such as a thermal alarm for exceeding a skin temperature threshold, for example), the efficiency management module may seek to reduce the frequency supplied to Core 2 regardless of whether Core 2 were "hotter" than Core 1 at the time of the trigger. In this way, thermal energy generation may be mitigated while the overall efficiency of processing a given MIPS of workload is optimized.

Figure 1D:
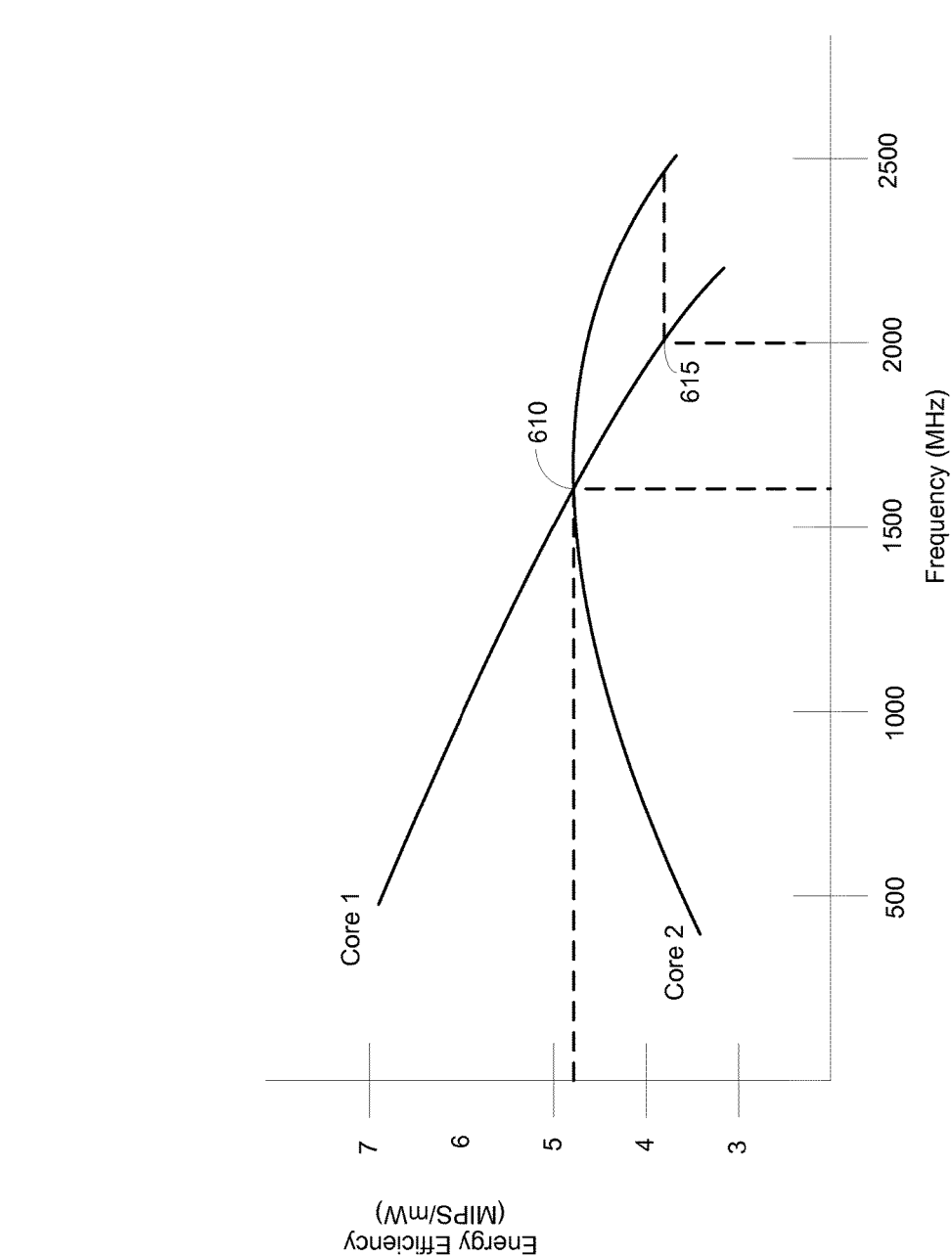
FIG. 1D is a graph illustrating a different pair of performance curves for the exemplary pair of cores depicted in the FIG. 1C illustration.

FIG. 1D is a graph 600 illustrating a different pair of performance curves for the exemplary pair of cores, Core 1 and Core 2, depicted in the FIG. 1C illustration. In FIG. 1D, each of the performance curves maps the energy efficiency of the core versus the frequency supplied to the core. Notably, points 610 and 615 in the FIG. 1D illustration correlate, respectively, with points 510 and 515/520 in the FIG. 1C illustration. Similarly, the maximum operating frequencies depicted in the FIG. 1D illustration correlate with the maximum operating frequencies depicted in the FIG. 1C illustration.

Using the performance data represented by the FIG. 1D illustration, an embodiment of an energy efficiency aware thermal management solution may respond to a thermal trigger by first reducing the frequency supplied to Core 1 if both cores are running at or near their maximum operating frequencies. Notably, at the maximum operating frequency of 2000 MHz, Core 1 is processing fewer MIPS of workload per mW of power consumed than is Core 2. Consequently, an exemplary energy efficiency aware thermal management solution may reduce the frequency of Core 1 by one step in an attempt to mitigate thermal energy generation and clear the thermal alarm. If the frequency reduction of the less efficient Core 1 does not clear the alarm, the exemplary energy efficiency aware thermal management solution may reevaluate which of the cores is less efficient after the first step reduction and then apply a second step reduction in frequency to the least energy efficient core. The process may continue in such a step by step manner, reducing frequency supplied to the least energy efficient core at the time of the step reduction, until the thermal alarm is cleared on a thermal mitigation goal is otherwise achieved.

Figure 2A:
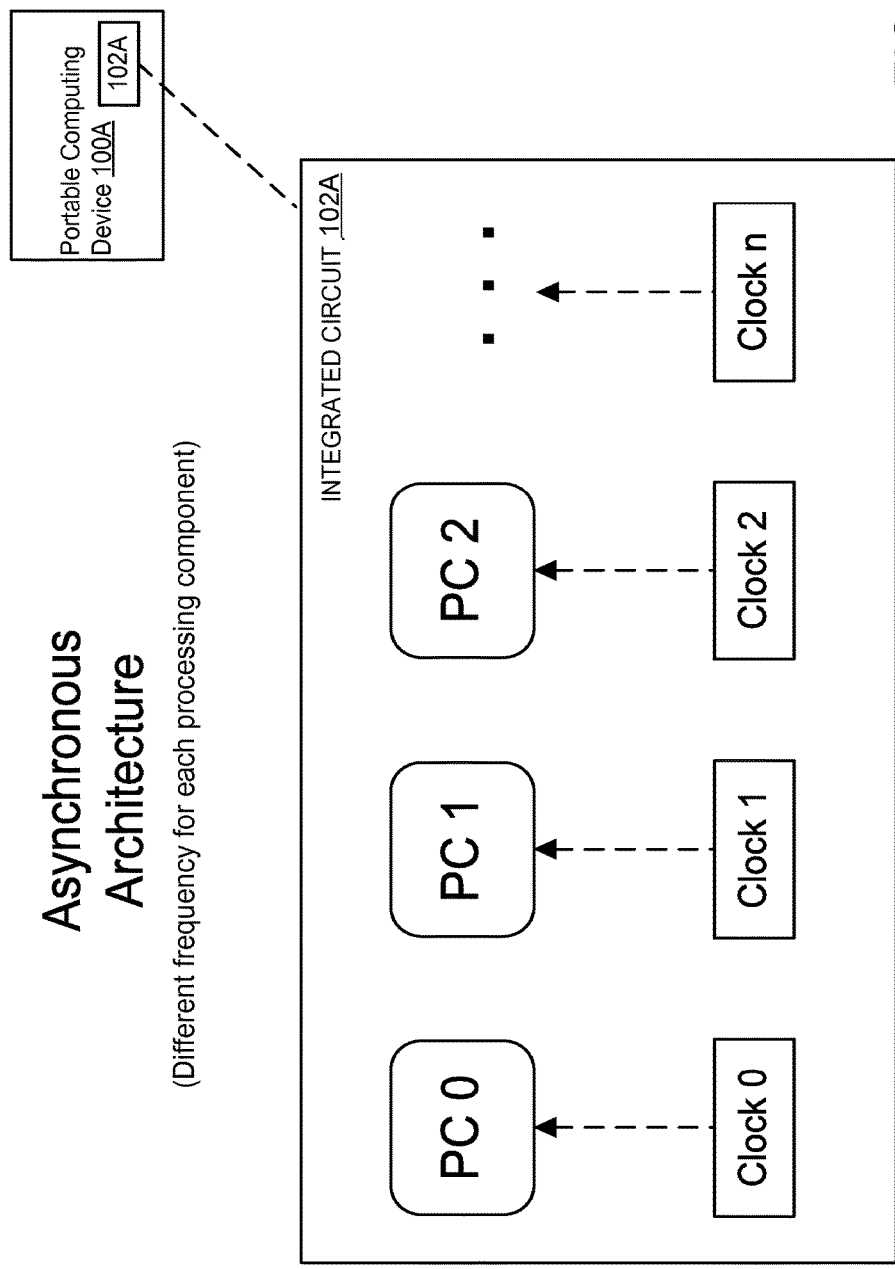
FIG. 2A is a functional block diagram illustrating aspects of an asynchronous architecture in an on-chip system that includes multiple processing components.

FIG. 2A is a functional block diagram illustrating aspects of an asynchronous architecture in an on-chip system 102A that includes heterogeneous processing components. Certain embodiments of an energy efficiency aware thermal management solution may be applicable to manage thermal energy generation by the processing components without unnecessarily degrading workload processing efficiency.

The on-chip system 102A is depicted to show a series of processing components PC 0, PC 1, PC 2, etc. Notably, because the architecture of on-chip system 102A is asynchronous, each of the processing components is associated with a dedicated clock source for controlling power supply voltage and clock generator frequency, such as a phase locked loop ("PLL") as would be understood by one of ordinary skill in the art. In the illustration, Clock 0 is uniquely associated with the power supply and clock generator to PC 0. Clock 1 is uniquely associated with the power supply and clock generator to PC 1. Clock 2 is uniquely associated with the power supply and clock generator to PC 2, and so on.

Advantageously, because each processing component in an asynchronous on-chip system has a dedicated clock source, embodiments of energy efficiency aware thermal management solutions may use a DCVS module to make targeted power reductions on the least energy efficient processing components when thermal energy generation has exceeded a threshold.

Figure 2B:
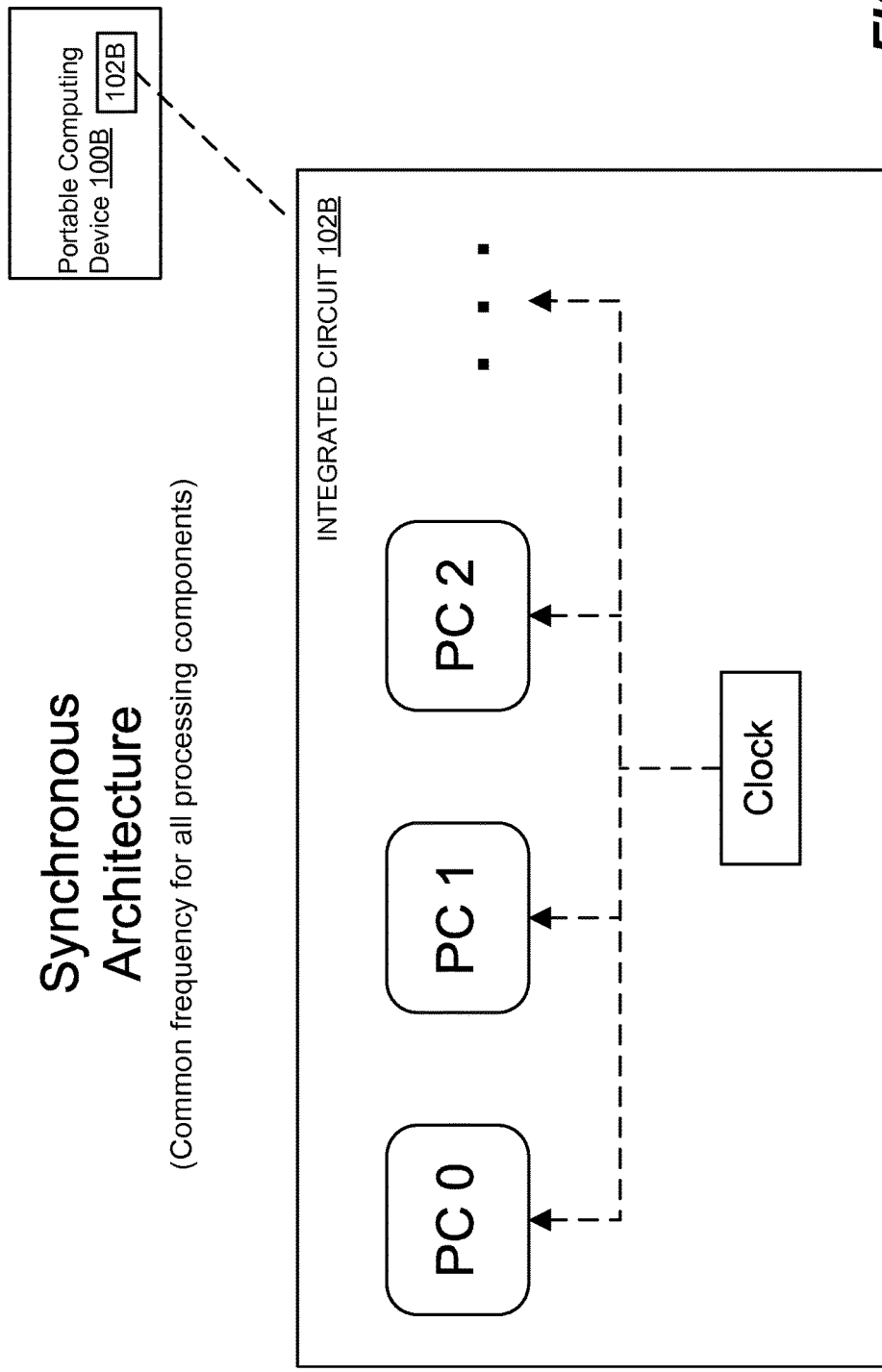
FIG. 2B is a functional block diagram illustrating aspects of a synchronous architecture in an on-chip system that includes multiple processing components.

FIG. 2B is a functional block diagram illustrating aspects of a synchronous architecture in an on-chip system 102B that includes heterogeneous processing components. Certain embodiments of an energy efficiency aware thermal management solution may be applicable to manage thermal energy generation by the processing components without unnecessarily degrading workload processing efficiency.

The on-chip system 102B is depicted to show a series of processing components PC 0, PC 1, PC 2, etc. Notably, because the architecture of on-chip system 102B is synchronous, each of the processing components is associated with a single, common clock source and power supply to all the processing components. Advantageously, because each processing component in a synchronous on-chip system shares a single clock source, embodiments of energy efficiency aware thermal management solutions may optimize processing efficiency when thermal energy generation has exceeded a threshold by allocating or reallocating workloads away from less efficient processing components and to more efficient processing components.

Notably, as less efficient processing components are without workloads, embodiments of energy efficiency aware thermal management solutions may dictate that the power states of the less efficient processing components transition from an active state to a retention state, or from a retention state to a power collapsed state, for example. Advantageously, by allocating new workloads to the more efficient processors and/or reallocating active workloads from the less efficient processors to the more efficient processors, embodiments of the solutions may optimize the amount of power required to process a given workload. Further, by transitioning less efficient processing components in a synchronous SoC 102B from active states to idle states, in view of latency parameters for bringing the less efficient processing components back online in the event that the more efficient processing components are unable to maintain an acceptable QoS, embodiments of the energy efficiency aware thermal management solution may further optimize overall power consumption efficiency.

Figure 3:
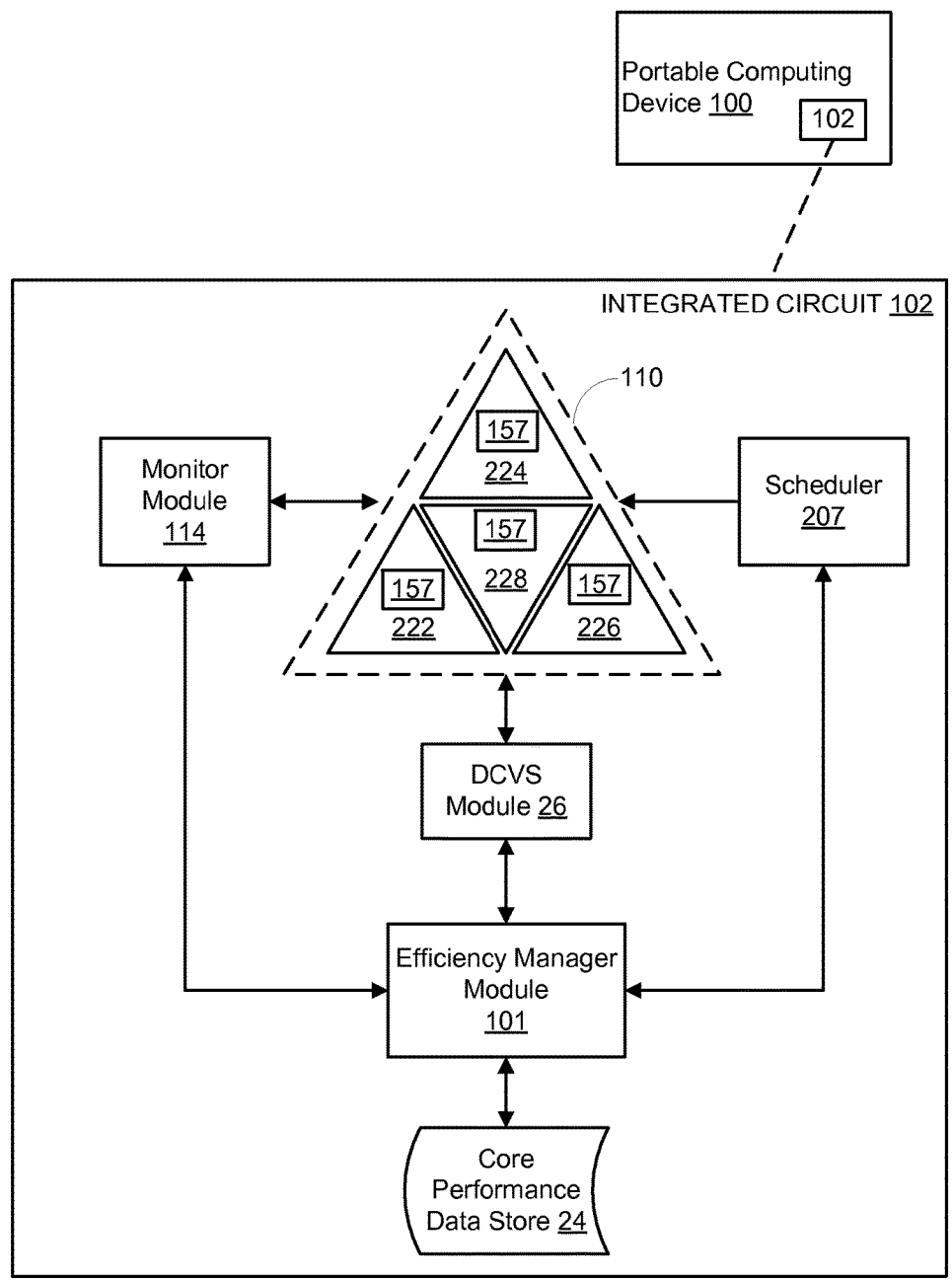
FIG. 3 is a functional block diagram illustrating an embodiment of an on-chip system for energy efficiency aware thermal management in a portable computing device ("PCD")

FIG. 3 is a functional block diagram illustrating an embodiment of an on-chip system 102 for energy efficiency aware thermal management in a portable computing device ("PCD") 100. Notably, it is envisioned that the on-chip system 102 may be synchronous or asynchronous in architecture. As explained above relative to the FIG. 1 illustration, the targeted reduction in power supply voltage and clock generator frequency and/or workload allocation across the processing components may be based on a comparative analysis of performance data uniquely associated with the individual cores or processors 222, 224, 226, 228. Notably, as one of ordinary skill in the art will recognize, the processing component(s) 110 is depicted as a group of heterogeneous processing engines for illustrative purposes only and may represent a single processing component having multiple, heterogeneous cores 222, 224, 226, 228 or multiple, heterogeneous processors 222, 224, 226, 228, each of which may or may not comprise multiple cores and/or sub-cores. As such, the reference to processing engines 222, 224, 226 and 228 herein as "cores" will be understood as exemplary in nature and will not limit the scope of the disclosure.

Figure 5A:
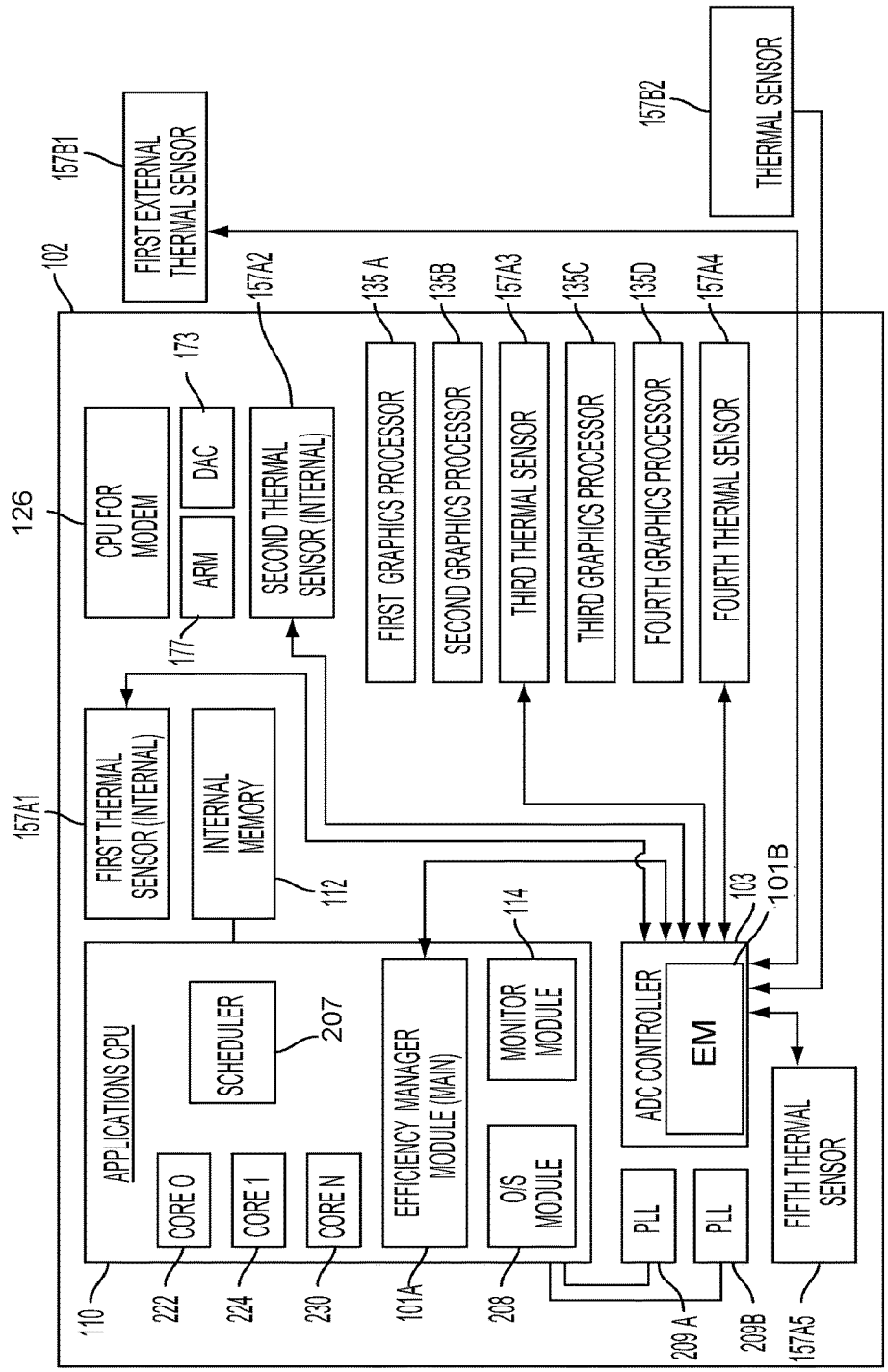
FIG. 5A is a functional block diagram illustrating an exemplary spatial arrangement of hardware for the chip illustrated in FIG. 4.

The on-chip system 102 may monitor temperature sensors 157 which are individually associated with cores 222, 224, 226, 228 with a monitor module 114 which is in communication with an efficiency manager ("EM") module 101, a DCVS module 26 and a scheduler module 207 (SEE FIG. 5A). The monitor module 114 may also monitor any number of thermal energy indicators which may exceed a threshold such as, but not limited to, a skin temperature sensor, a PoP memory temperature sensor, a junction temperature sensor, a current sensor on power rails to processing components, a current sensor associated with a power supply, a power supply capacity sensor, etc.

In the event that a thermal threshold is exceeded and recognized by the monitor module 114, the EM module 101 may be triggered to take measures to mitigate thermal energy generation in an energy efficiency aware manner. The EM module 101 may receive from the monitor module 114 indications of one or more monitored parameters associated with the energy efficiency of the processing components and then use those indications to determine which of the processing components is least energy efficient. In some embodiments, the EM module 101 may receive temperature measurements from the monitor module 114 and use the measurements to query performance data from the core performance data store 24. Based on the performance data, the EM module 101 may determine a ranking of the cores 222, 224, 226, 228 by workload processing efficiency.

Subsequently, the EM module 101 may determine to reduce the power supply voltage and clock generator frequency to the less efficient core(s) in an asynchronous system 102A or, in a synchronous system 102B, the EM module 101 may cause workloads to be reallocated from a less efficient core to a more efficient core or queued workloads to be scheduled to more efficient cores. The dynamic DCVS adjustment policies dictated by the EM module 101 may set processor clock speeds at reduced levels on less efficient processing components, transition power states of certain less efficient processors from active states to idle states, etc. In some embodiments, workload allocations and/or reallocations dictated by the EM module 101 may be implemented via instructions to the scheduler 207. Notably, through application of energy efficiency aware thermal management policies, the EM module 101 may reduce or alleviate excessive power consumption at the cost of QoS.

As one of ordinary skill in the art will recognize, the operating temperature of one or more of the processing cores 222, 224, 226, 228 may fluctuate as workloads are processed, ambient conditions change, adjacent thermal energy generators dissipate energy, etc. Accordingly, as the operating temperatures of the various processing cores 222, 224, 226, 228 fluctuate, so does the relevant performance data associated with those engines 222, 224, 226, 228. As the operating temperatures associated with each of the cores 222, 224, 226, 228 change, the monitor module 114 recognizes the change and may transmit temperature data indicating the change to the EM module 101. The change in measured operating temperatures may trigger the EM module 101 to reference a core performance ("CP") data store 24 to query performance curves for one or more of the cores 222, 224, 226, 228 based on the measured operating temperatures. Subsequently, the EM module 101 may identify a different core 222, 224, 226, 228 as the least energy efficient core and adjust the power frequency supplied to it (via DCVS module 26) so that thermal energy generated is mitigated while maintaining the most efficient processing of workload per milliwatt of power consumed. The EM module 101 may also compare the identified performance curves and select the core 222, 224, 226, 228 best positioned at the time of comparison to efficiently process a queued block of code, or a block of code in need of reallocation from a less efficient core.

An exemplary EM module 101 is configured to leverage a comparative analysis of one or more performance curves associated with the various, diverse processing components 222, 224, 226, 228 to either instruct the DCVS module 26 to adjust power supplies and/or to instruct the scheduler module 207 to allocate or reallocate a workload to a certain processing component which is best positioned to efficiently process the workload. Notably, one of ordinary skill in the art will recognize that, as the operating temperatures of the processing components 222, 224, 226, 228 change, the performance curves queried and compared by the EM module 101 will also change. As such, at different times the EM module 101 may select different processing engines 222, 224, 226, 228 for application of energy efficiency aware thermal management policies. In this way, it is an advantage of certain embodiments that an EM module 101 optimizes QoS when managing thermal energy generation by ensuring workload assignments are allocated to the most efficient processing components available at the time of allocation and/or power consumption by the least energy efficient processing components is reduced in favor of allowing the more efficient processors to handle the active workload.

Figure 4:
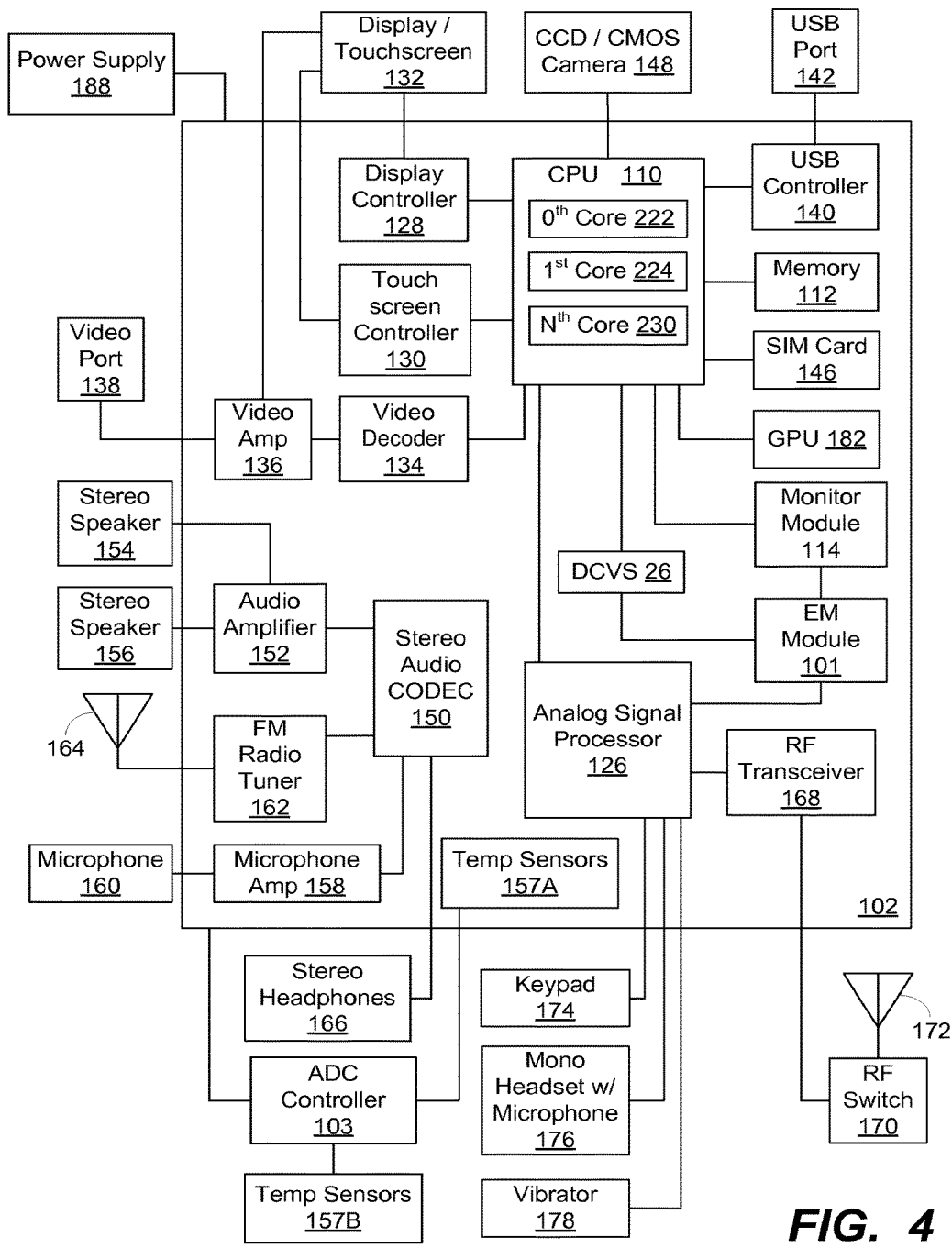
FIG. 4 is a functional block diagram of an exemplary, non-limiting aspect of a PCD in the form of a wireless telephone for implementing methods and systems for monitoring thermal conditions, comparing performance data, setting optimal power frequencies and scheduling workloads to processing components best positioned for efficient processing.

FIG. 4 is a functional block diagram of an exemplary, non-limiting aspect of a PCD 100 in the form of a wireless telephone for implementing methods and systems for monitoring thermal conditions, comparing performance data, setting optimal power frequencies and scheduling workloads to processing components best positioned for efficient processing. As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions.

In general, the efficiency manager module(s) 101 may receive temperature data from the monitor module 114 and use the temperature data to query performance data, or deduce performance data, associated with the cores 222, 224, 230, determine the relative processing efficiencies of the cores 222, 224, 230, and work with a DCVS module 26 and/or scheduler 207 to adjust power supplies, transition power states, and/or schedule blocks of code to the cores 222, 224, 230.

The monitor module 114 communicates with multiple operational sensors (e.g., thermal sensors 157) distributed throughout the on-chip system 102 and with the CPU 110 of the PCD 100 as well as with the EM module(s)101. The EM module 101 may work with the monitor module 114 to query processor performance curves related to the temperatures monitored by the monitor module 114, compare the curves, set the power frequencies to the most efficient levels, and select the most efficient processor available and capable of processing a block of code.

As illustrated in FIG. 4, a display controller 128 and a touchscreen controller 130 are coupled to the digital signal processor 110. A touchscreen display 132 external to the on-chip system 102 is coupled to the display controller 128 and the touchscreen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touchscreen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the invention.

The thermal sensors 157, in addition to being controlled and monitored by an ADC controller 103, may also be controlled and monitored by one or more EM module(s) 101. The EM module(s) 101 may comprise software that is executed by the CPU 110. However, the EM module(s) 101 may also be formed from hardware and/or firmware without departing from the scope of the invention. The EM module(s) 101 may be responsible for querying processor performance data and/or receiving indications of processor performance and, based on an analysis of the data, adjusting the power frequencies of the least energy efficient processors and/or allocating or reallocating blocks of code to processors most capable of efficiently processing the code at the time of workload allocation.

Returning to FIG. 4, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more EM module(s) 101. The instructions that form the EM module(s) 101 may be executed by the CPU 110, the analog signal processor 126, or another processor in addition to the ADC controller 103 to perform the methods described herein. Further, the processors 110, 126, the memory 112, the instructions stored therein, or a combination thereof may serve as a means for performing one or more of the method steps described herein.

FIG. 5A is a functional block diagram illustrating an exemplary spatial arrangement of hardware for the chip 102 illustrated in FIG. 4. According to this exemplary embodiment, the applications CPU 110 is positioned on the far left side region of the chip 102 while the modem CPU 126 is positioned on a far right side region of the chip 102. The applications CPU 110 may comprise a heterogeneous multi-core processor that includes a zeroth core 222, a first core 224, and an Nth core 230. The applications CPU 110 may be executing an EM module 101A (when embodied in software) or it may include EM module 101A (when embodied in hardware). The application CPU 110 is further illustrated to include operating system ("O/S") module 208 and a monitor module 114.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own EM module 101B that works in conjunction with the main module 101A of the applications CPU 110.

The EM module 101B of the ADC controller 103 may be responsible, in conjunction with the monitor module 114, for monitoring and tracking multiple thermal sensors 157 that may be provided "on-chip" 102 and "off-chip" 102. The on-chip or internal thermal sensors 157A may be positioned at various locations.

As a non-limiting example, a first internal thermal sensor 157A1 may be positioned in a top center region of the chip 102 between the applications CPU 110 and the modem CPU 126 and adjacent to internal memory 112. A second internal thermal sensor 157A2 may be positioned below the modem CPU 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog converter ("DAC") 173 may be positioned between the second internal thermal sensor 157A2 and the modem CPU 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 5A may be provided without departing from the scope of the invention. FIG. 5A illustrates one exemplary spatial arrangement and how the main EM module 101A and ADC controller 103 with its EM module 101B may work with a monitor module 114 to recognize thermal conditions that are a function of the exemplary spatial arrangement illustrated in FIG. 5A, compare processing efficiency data and allocate workloads or adjust power supplies to manage thermal conditions without unnecessarily impacting QoS.

Figure 5B:
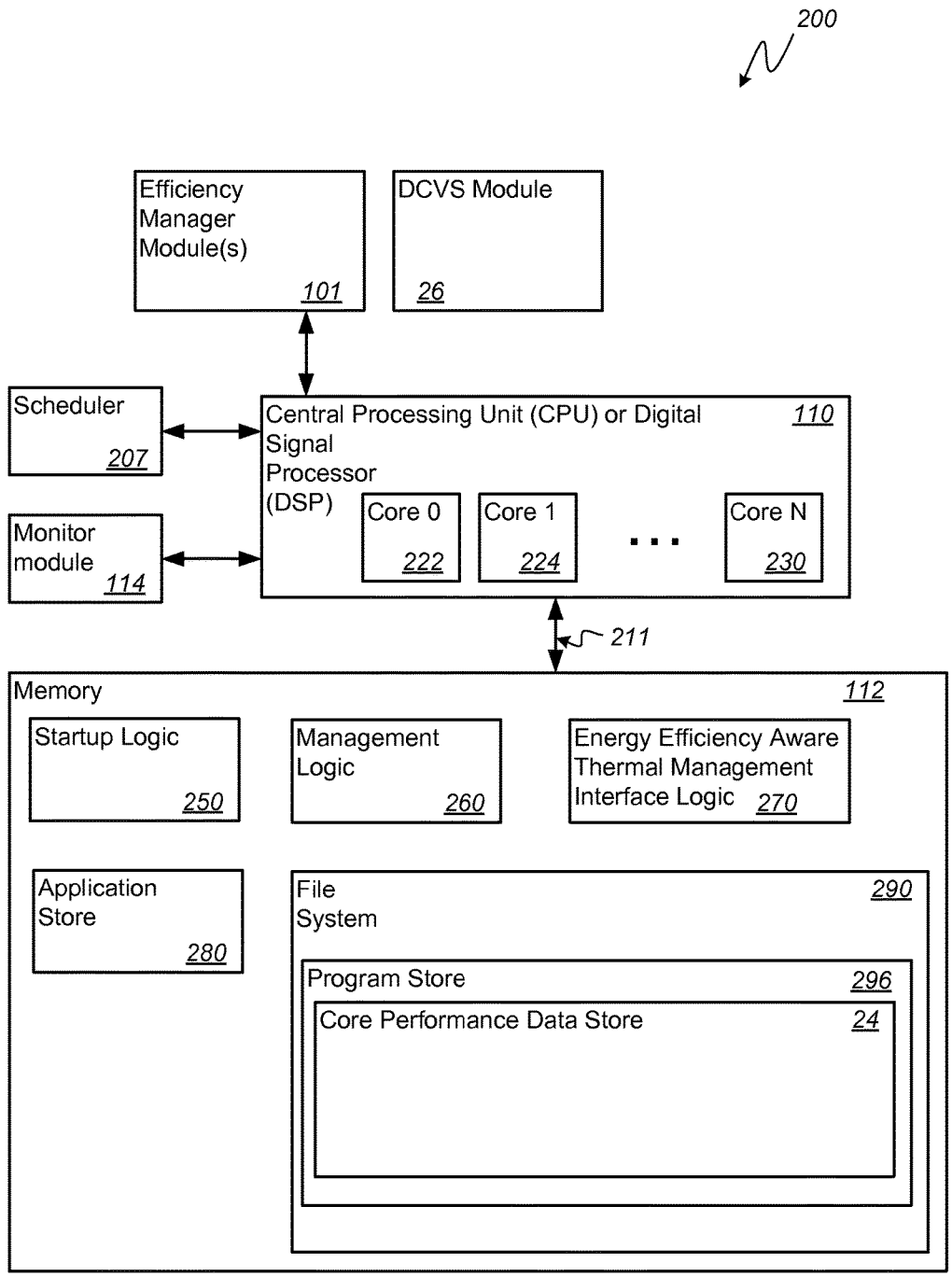
FIG. 5B is a schematic diagram illustrating an exemplary software architecture of the PCD of FIG. 4 and FIG. 5A for supporting identification of thermal conditions and application of energy efficiency aware thermal management algorithms.

FIG. 5B is a schematic diagram illustrating an exemplary software architecture 200 of the PCD 100 of FIG. 4 and FIG. 5A for supporting identification of thermal conditions and application of energy efficiency aware thermal management algorithms. Any number of algorithms may form or be part of at least one energy efficiency aware thermal management technique that may be applied by the EM manager 101 when certain thermal conditions are met.

As illustrated in FIG. 5B, the CPU or digital signal processor 110 is coupled to the memory 112 via a bus 211. The CPU 110, as noted above, is a multiple-core, heterogeneous processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous processor, may provide differing levels of performance under similar thermal operating conditions. Alternatively, one or more applications or programs can be distributed for processing across two or more of the available heterogeneous cores.

The CPU 110 may receive commands from the EM module(s) 101 that may comprise software and/or hardware. If embodied as software, the EM module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 5B, it should be noted that one or more of startup logic 250, management logic 260, energy efficiency aware thermal management interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the energy efficiency aware thermal management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor (or additional processor cores).

The startup logic 250 includes one or more executable instructions for selectively identifying, loading, and executing a select program for energy efficiency aware comparative analysis and identification of one or more of the available cores for application of a energy efficiency aware thermal management policy.

The management logic 260 includes one or more executable instructions for terminating an energy efficiency aware thermal management program, as well as selectively identifying, loading, and executing a more suitable replacement program for energy efficiency aware comparative analysis, selection for adjusted power supplies and/or workload allocation to one or more of the available cores. The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor, may operate in accordance with one or more signals provided by the EM module 101 and monitor module 114. In this regard, the monitor module 114 may provide one or more indicators of events, processes, applications, resource status conditions, elapsed time, temperature, etc in response to control signals originating from the EM module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to reallocate workloads from a less efficient core to a more efficient core when a temperature measurement associated with skin temperature exceeds a certain identified threshold. By way of further example, the inputs may include a change to the management logic 260 that instructs the PCD 100 to reduce power by one increment to a least energy efficient processing core when a battery level reaches a certain floor amount.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged core performance data store 24. In this regard, the file system 290 may include a reserved section of its total file system capacity for the storage of information associated with the performance curves of the various cores 222, 224, 226, 228 at various operating temperatures.

Figure 6:
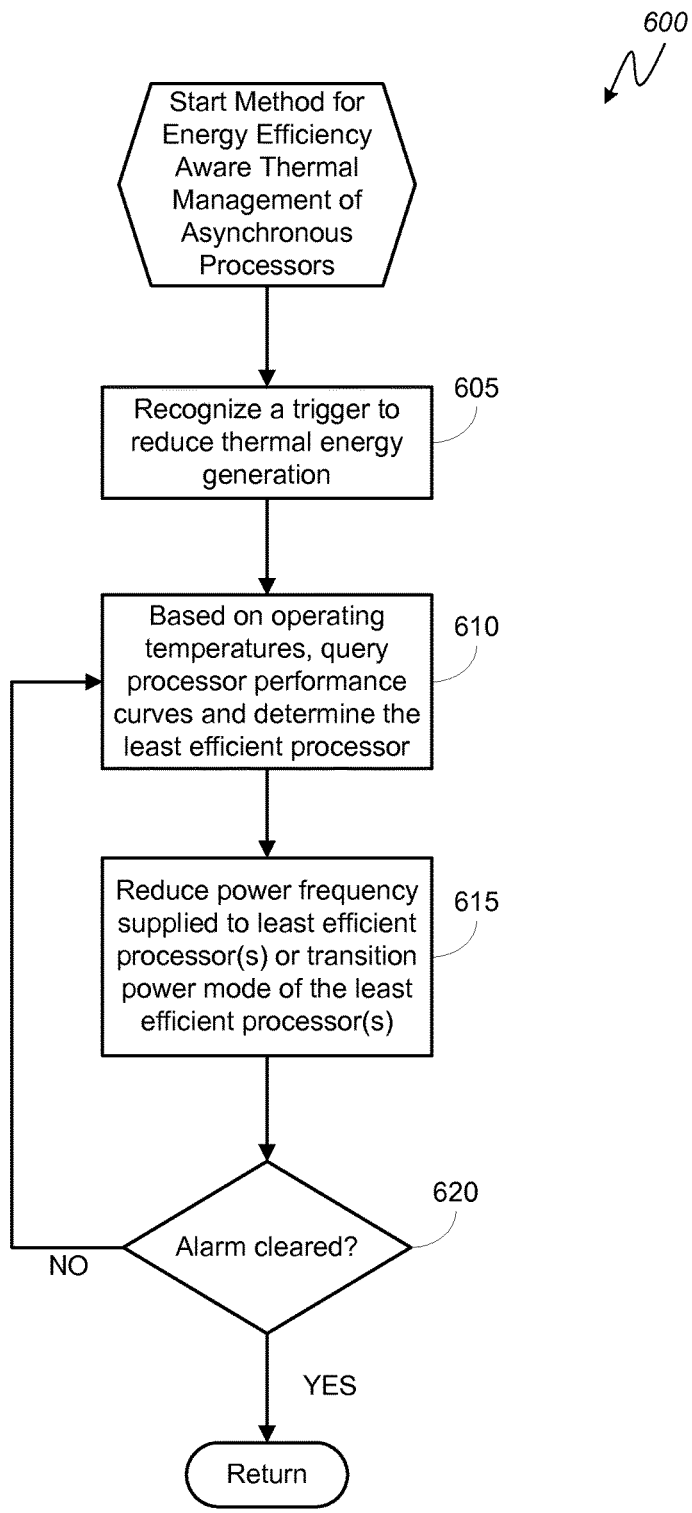
FIG. 6 is a logical flowchart illustrating an embodiment of a method for energy efficiency aware thermal management in an asynchronous system on a chip.

FIG. 6 is a logical flowchart illustrating an embodiment of a method 600 for energy efficiency aware thermal management in an asynchronous system on a chip. In the FIG. 6 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocations and compiled into empirical performance curves. The empirical performance curves may be stored in the CP data store 24 and used by an energy efficiency aware thermal management algorithm.

Beginning at block 605, the monitor module 114 may recognize a thermal event, such as a temperature reading in excess of a predetermined temperature threshold, as a trigger to reduce thermal energy generation. As previously described, the monitor module 114 may provide such thermal alarm information to the EM module 101 for application of an energy efficiency aware thermal management solution.

At block 610, the EM module 101 may query performance data associated with the various heterogeneous processing components in the SoC. The relevant performance data may be queried based on operating temperatures provided to the EM module 101 by the monitor module 114. Using the performance data, the EM module 101 may determine a ranking of the processing components based on their relative abilities to efficiently process a workload.

At block 615, the EM module 101 may reduce the frequency of power supplied to one or more of the less efficient processing cores by a predetermined increment. Notably, one of ordinary skill in the art will recognize that a reduction in frequency directly correlates with a reduction in the amount of a workload processed by the processing component.

Next, at decision block 620, the EM module 101 may work with the monitor module 114 to determine whether the thermal alarm that triggered blocks 610 and 615 has cleared. If the alarm has cleared, i.e. the reduction in frequency implemented at block 615 resulted in a reduced thermal energy generation that successfully cleared the alarm, the "yes" branch is followed and the method 600 returns. The EM module 101 may authorize an increase in frequency supplied to the less efficient processing core(s). If, however, the alarm has not cleared as a result of the action(s) taken at block 615, the "no" branch is followed back to block 610 and a "new" least energy efficient processing component is identified for an incremental reduction in power frequency. Notably, it will be understood that a "new" least energy efficient processing component may be the same processing component that was previously identified as the least energy efficient processing component. The loop from blocks 610 through 620 continues, incrementally reducing the frequency of power supplied to the least energy efficient processing components, until the thermal alarm clears.

Figure 7:
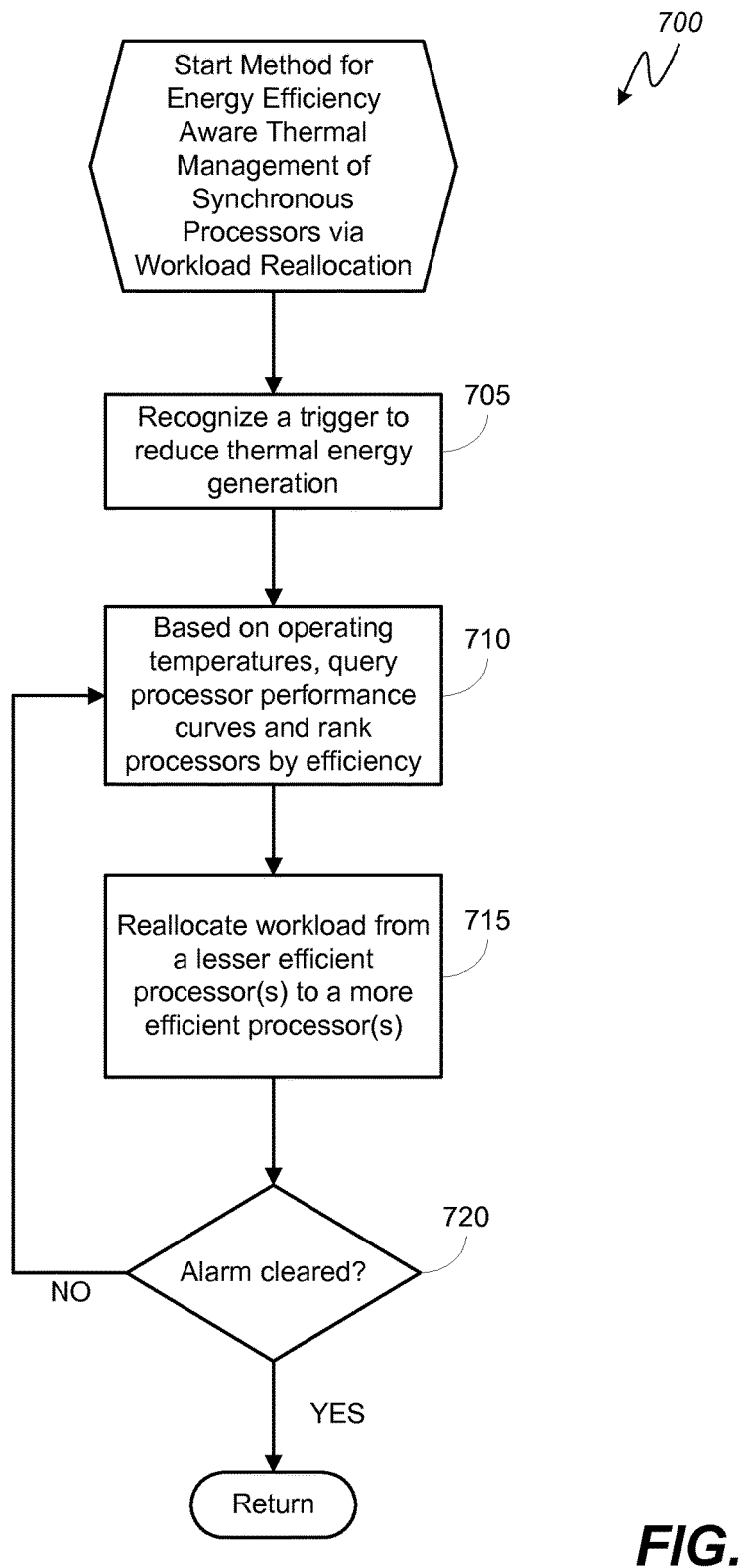
FIG. 7 is a logical flowchart illustrating an embodiment of a method 700 for energy efficiency aware thermal management in a synchronous system on a chip via workload reallocation.

FIG. 7 is a logical flowchart illustrating an embodiment of a method 700 for energy efficiency aware thermal management in a synchronous system on a chip via workload reallocation. In the FIG. 7 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocations and compiled into empirical performance curves. The empirical performance curves may be stored in the CP data store 24 and used by an energy efficiency aware thermal management algorithm.

Beginning at block 705, the monitor module 114 may recognize a thermal event, such as a temperature reading in excess of a predetermined temperature threshold, as a trigger to reduce thermal energy generation. As previously described, the monitor module 114 may provide such thermal alarm information to the EM module 101 for application of an energy efficiency aware thermal management solution.

At block 710, the EM module 101 may query performance data associated with the various heterogeneous processing components in the SoC. The relevant performance data may be queried based on operating temperatures provided to the EM module 101 by the monitor module 114. Using the performance data, the EM module 101 may determine a ranking of the processing components based on their relative abilities to efficiently process a workload.

At block 715, the EM module 101 may reallocate active workloads being processed by a less efficient processor to a more efficient processor. Notably, one of ordinary skill in the art will recognize that moving a workload from a less efficient processor to a more efficient processor may result in the workload being processed at a reduced amount of power even though the less efficient processor and the more efficient processor share a common power supply and clock generator.

Next, at decision block 720, the EM module 101 may work with the monitor module 114 to determine whether the thermal alarm that triggered blocks 710 and 715 has cleared. If the alarm has cleared, i.e. reallocation of the workload from the less efficient processor to the more efficient processor resulted in a reduced thermal energy generation that successfully cleared the alarm, the "yes" branch is followed and the method 700 returns. The EM module 101 may authorize future allocation or reallocation of workloads to the less efficient processing core(s). If, however, the alarm has not cleared as a result of the action(s) taken at block 715, the "no" branch is followed back to block 710 and a "new" least energy efficient processing component is identified for workload reduction. Notably, it will be understood that a "new" least energy efficient processing component may be the same processing component that was previously identified as the least energy efficient processing component. The loop from blocks 710 through 720 continues, moving workload off the least energy efficient processing components, until the thermal alarm clears.

Figure 8:
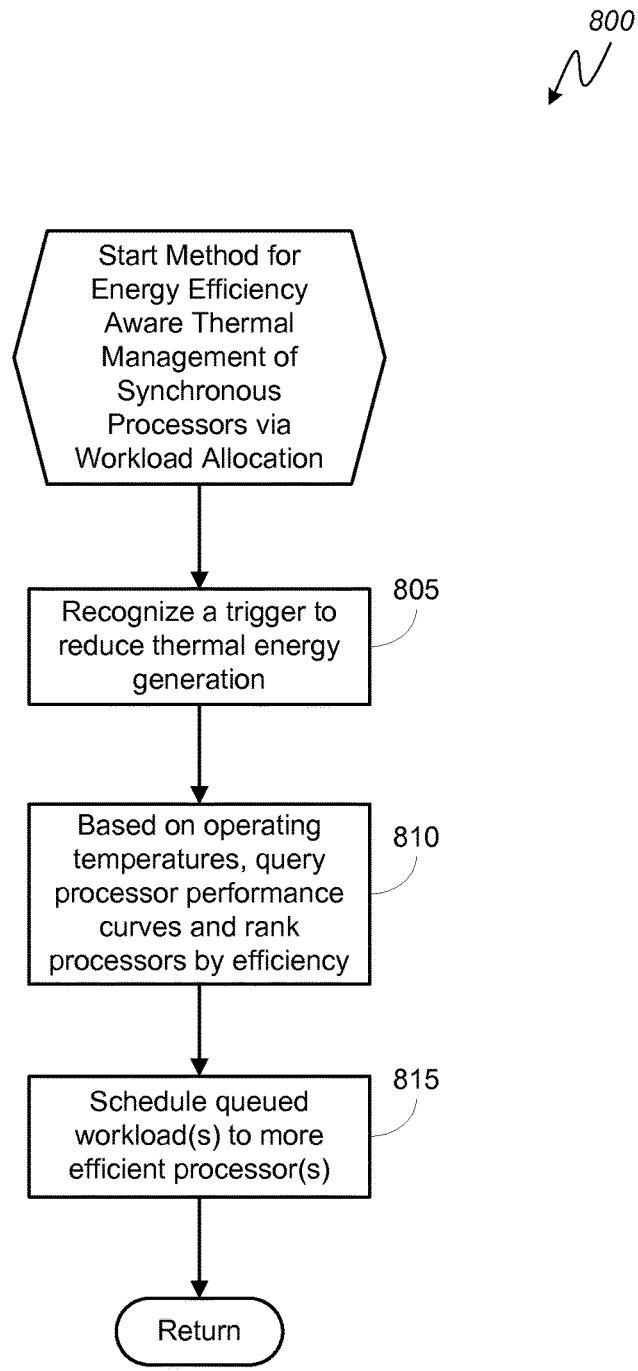
FIG. 8 is a logical flowchart illustrating an embodiment of a method for energy efficiency aware thermal management in a synchronous system on a chip via allocation of queued workloads.

FIG. 8 is a logical flowchart illustrating an embodiment of a method 800 for energy efficiency aware thermal management in a synchronous system on a chip via allocation of queued workloads. In the FIG. 8 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocations and compiled into empirical performance curves. The empirical performance curves may be stored in the CP data store 24 and used by an energy efficiency aware thermal management algorithm.

Beginning at block 805, the monitor module 114 may recognize a thermal event, such as a temperature reading in excess of a predetermined temperature threshold, as a trigger to reduce thermal energy generation. As previously described, the monitor module 114 may provide such thermal alarm information to the EM module 101 for application of an energy efficiency aware thermal management solution.

At block 810, the EM module 101 may query performance data associated with the various heterogeneous processing components in the SoC. The relevant performance data may be queried based on operating temperatures provided to the EM module 101 by the monitor module 114. Using the performance data, the EM module 101 may determine a ranking of the processing components based on their relative abilities to efficiently process a workload.

At block 815, the EM module 101 may instruct a scheduler 207 to allocate queued workloads to the processor(s) best positioned to most efficiently process the workloads. Notably, one of ordinary skill in the art will recognize that allocating a workload to a more efficient processor may result in the workload being processed at a reduced amount of power.

Notably, the EM module 101 may continue to work with the monitor module 114 to identify "new" more efficient processing components for workload allocation. Notably, it will be understood that a "new" more efficient processing component may be the same processing component that was previously identified as the more efficient processing component. In this way, the energy efficiency aware thermal management solution of method 800 may continually ensure that new workloads are scheduled to the processing component best positioned at the time of processing to consume the least amount of power.

Figure 9:
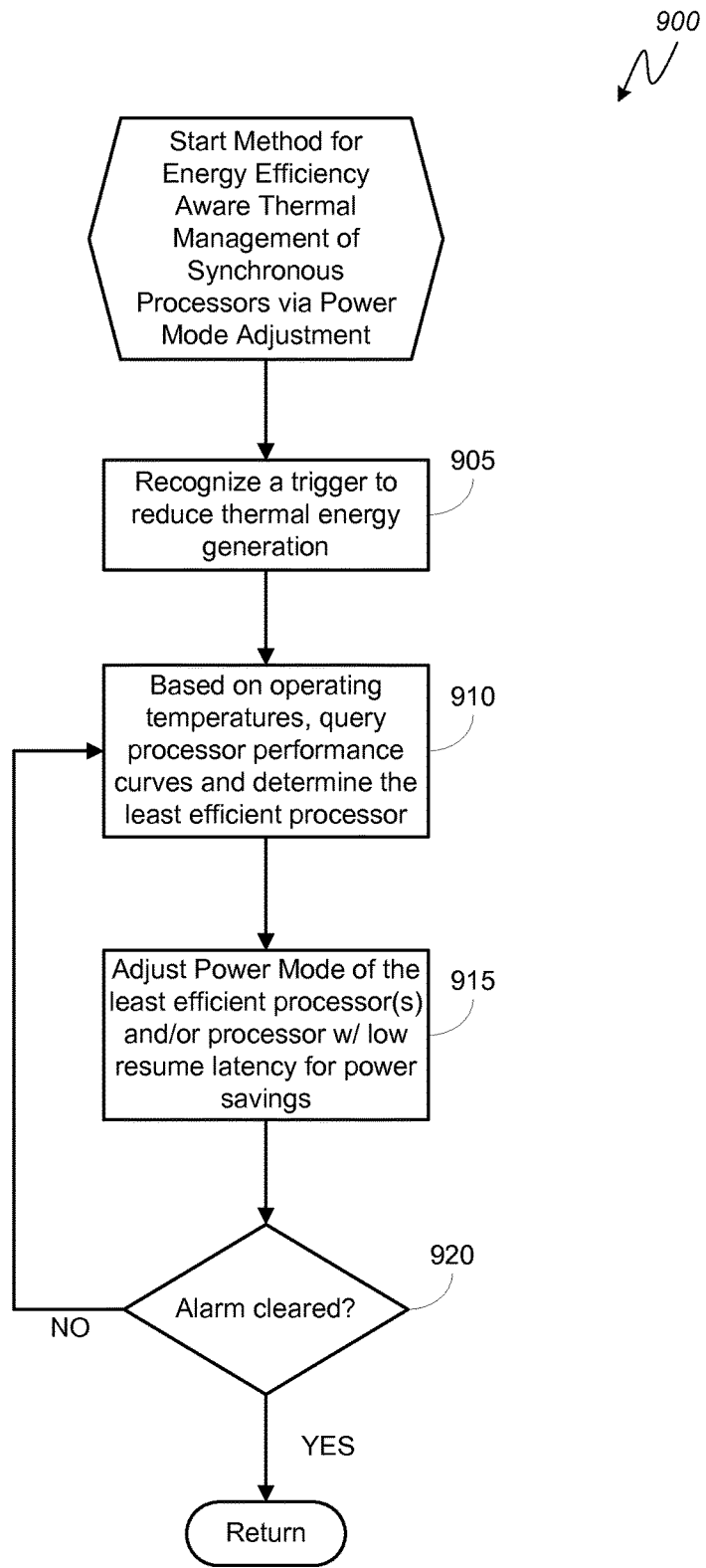
FIG. 9 is a logical flowchart illustrating an embodiment of a method for energy efficiency aware thermal management in a synchronous system on a chip via power mode adjustment.

FIG. 9 is a logical flowchart illustrating an embodiment of a method 900 for energy efficiency aware thermal management in a synchronous system on a chip via power mode adjustment. In the FIG. 9 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocations and compiled into empirical performance curves. The empirical performance curves may be stored in the CP data store 24 and used by an energy efficiency aware thermal management algorithm.

Beginning at block 905, the monitor module 114 may recognize a thermal event, such as a temperature reading in excess of a predetermined temperature threshold, as a trigger to reduce thermal energy generation. As previously described, the monitor module 114 may provide such thermal alarm information to the EM module 101 for application of an energy efficiency aware thermal management solution.

At block 910, the EM module 101 may query performance data associated with the various heterogeneous processing components in the SoC. The relevant performance data may be queried based on operating temperatures provided to the EM module 101 by the monitor module 114. Using the performance data, the EM module 101 may determine a ranking of the processing components based on their relative abilities to efficiently process a workload.

At block 915, the EM module 101 may adjust the power mode of the less efficient processor(s) in an effort to reduce unnecessary power consumption. It is envisioned that the EM module 101 may identify the processor best positioned to have its power mode adjusted based on various parameters including, but not limited to, the latency associated with the processor transitioning from a given idle state power mode to an active power mode. Notably, one of ordinary skill in the art will recognize that adjusting the power mode of a processor from an active mode to a retention mode or power collapsed mode may result in an average savings in power consumption across the SoC.

Next, at decision block 920, the EM module 101 may work with the monitor module 114 to determine whether the thermal alarm that triggered blocks 910 and 915 has cleared. If the alarm has cleared, i.e. adjusting the power mode of the least energy efficient processor resulted in a reduced thermal energy generation that successfully cleared the alarm, the "yes" branch is followed and the method 900 returns. The EM module 101 may authorize a return to a higher power consuming power mode for the less efficient processing core(s). If, however, the alarm has not cleared as a result of the action(s) taken at block 915, the "no" branch is followed back to block 910 and a "new" least energy efficient processing component is identified for power mode transition. Notably, it will be understood that a "new" least energy efficient processing component may be the same processing component that was previously identified as the least energy efficient processing component.

Figure 10:
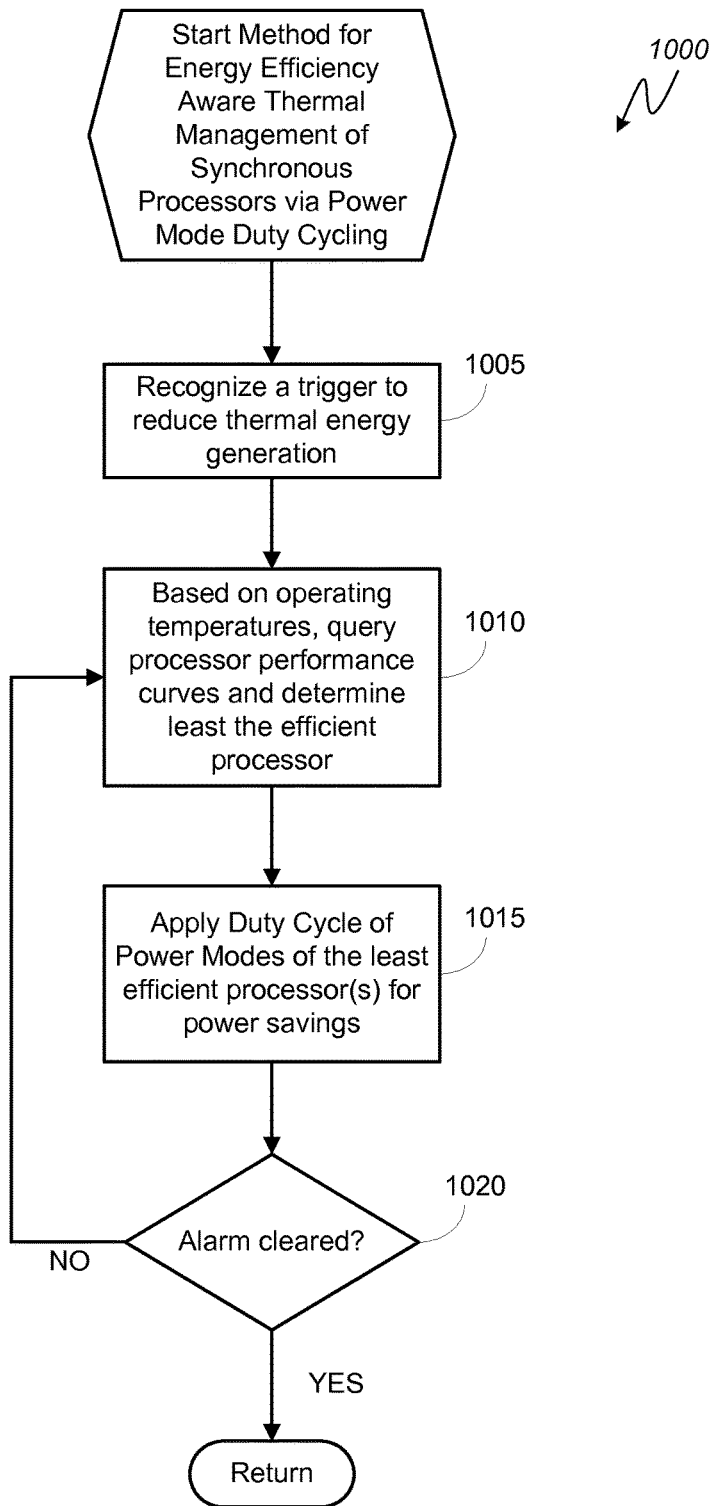
FIG. 10 is a logical flowchart illustrating an embodiment of a method for energy efficiency aware thermal management in a synchronous system on a chip via power mode duty cycling.

FIG. 10 is a logical flowchart illustrating an embodiment of a method 1000 for energy efficiency aware thermal management in a synchronous system on a chip via power mode duty cycling. In the FIG. 10 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocations and compiled into empirical performance curves. The empirical performance curves may be stored in the CP data store 24 and used by an energy efficiency aware thermal management algorithm.

Beginning at block 1005, the monitor module 114 may recognize a thermal event, such as a temperature reading in excess of a predetermined temperature threshold, as a trigger to reduce thermal energy generation. As previously described, the monitor module 114 may provide such thermal alarm information to the EM module 101 for application of an energy efficiency aware thermal management solution.

At block 1010, the EM module 101 may query performance data associated with the various heterogeneous processing components in the SoC. The relevant performance data may be queried based on operating temperatures provided to the EM module 101 by the monitor module 114.

Using the performance data, the EM module 101 may determine a ranking of the processing components based on their relative abilities to efficiently process a workload.

At block 1015, the EM module 101 may cycle the power modes of the less efficient processor(s) in an effort to reduce unnecessary power consumption. By cycling the power modes, the processor may transition through its various power modes, such as toggling between a retention state and an active state for example. By dwelling for a period of time in each of a plurality of power modes, the average power consumption by the processing component may be optimized. It is envisioned that the EM module 101 may identify the processor best positioned to cycle its power modes based on various parameters including, but not limited to, the latency associated with the processor transitioning from a given power mode to another power mode. Notably, one of ordinary skill in the art will recognize that cycling a processor through its power modes may result in an average savings in power consumption across the SoC without fully sacrificing the processing capacity of the cycle processor.

Next, at decision block 1020, the EM module 101 may work with the monitor module 114 to determine whether the thermal alarm that triggered blocks 1010 and 1015 has cleared. If the alarm has cleared, i.e. cycling the power mode of the least energy efficient processor resulted in a reduced thermal energy generation that successfully cleared the alarm, the "yes" branch is followed and the method 1000 returns. The EM module 101 may authorize discontinuing the duty cycle of power modes for the less efficient processing core(s). If, however, the alarm has not cleared as a result of the action(s) taken at block 1015, the "no" branch is followed back to block 1010 and a "new" least energy efficient processing component is identified for power mode cycling. Notably, it will be understood that a "new" least energy efficient processing component may be the same processing component that was previously identified as the least energy efficient processing component.

Figure 11:
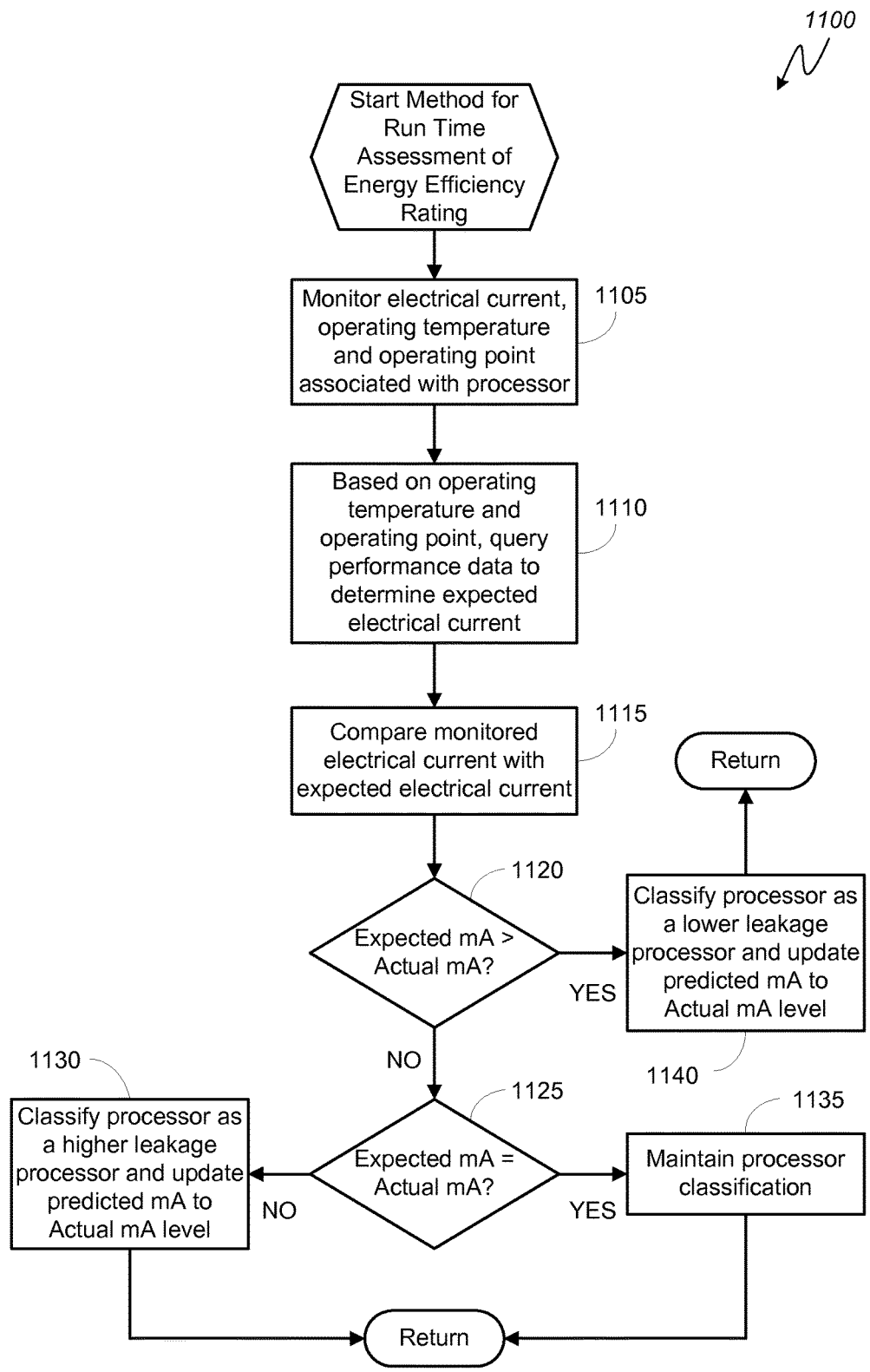
FIG. 11 is a logical flowchart illustrating an embodiment of a method for runtime verification of a processing component energy efficiency rating.

FIG. 11 is a logical flowchart illustrating an embodiment of a method 1100 for runtime verification of a processing component energy efficiency rating. As explained above relative to exemplary embodiments of an energy efficiency aware thermal management solution, performance data associated with various heterogeneous processing components may be used to determine which of the processing components is least energy efficient in processing a workload (energy efficiency may be measured in MIPS/mW or MHz/mW given that power frequency to a processing component directly correlates with the processing capacity of the processing component). The performance data may be empirically determined based on actual performance data gathered by the monitoring module 114 or, in some embodiments, the performance curves may be a priori curves driven by the performance specs of each core.

Notably, a priori performance data derived from the performance specs of a processing component may not be accurate or may lose its accuracy as the processing component wears over time. As such, embodiments of the method 1100 seek to verify the validity of the performance data associated with a given processing core prior to an energy efficiency aware thermal management solution relying on the performance data to make determinations regarding energy efficiencies.

Because the monitor module 114 and/or the EM module 101 may access electrical current sensors and temperature sensors around the chip 102, and because the EM module 101 may query previously profiled performance data stored in CP data store 24, embodiments of the method 1100 may be used to verify the accuracy of, and update if necessary, the stored performance data associated with a processing component. The relevant electrical current measurements and temperature measurements may be sampled and compared to stored performance data to determine whether a processing component or subsystem is actively exhibiting expected current leakage characteristics.

At block 1105, the monitor module 114 may monitor the electrical current, operating temperature and operating point (e.g., power frequency setting MHz) associated with a particular processing component. At block 1110, the EM module 101 may query stored performance data based on the operating temperature and operating point measured by the monitor module 114 at block 1105. The stored performance data may include an expected electrical current level in view of the processing component's performance specs, the operating point and the operating temperature.

Next, at block 1115, the EM module 101 may compare the expected electrical current leakage with the measured current leakage. At decision block 1120, if the expected current leakage is greater than the actual measured leakage, then the "yes" branch is followed to block 1140 and the processing component is designated as a lower leakage processor relative to its initial classification. The expected current leakage associated with the processing component in the CP store 24 may be updated to reflect the actual measured current leakage. The method 1100 returns.

Returning to decision block 1120, if the expected current leakage is not greater than the actual measured current leakage, then the "no" branch is followed to decision block 1125. At decision block 1125, if the expected current leakage is substantially equivalent to the actual measured current leakage, within some range of acceptable statistical significance, the "yes" branch is followed to block 1135 and the classification of the processing component is maintained. The method 1100 returns.

If at decision block 1125 the expected current leakage does not substantially equal the actual measured current leakage, i.e. the expected current leakage is lower than the actual measured current leakage, then the "no" branch is followed to block 1130. At block 1130, the processing component is designated as a higher leakage processor relative to its initial classification. The expected current leakage associated with the processing component in the CP store 24 may be updated to reflect the actual measured current leakage. The method 1100 returns.

Advantageously, by verifying and updating the relative leakage classifications of processing components, an energy efficiency aware thermal management solution may be better equipped to make assessments as to which processing components are more or less efficient than other processing components before applying thermal mitigation measures.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing thermal energy generation in a portable computing device having a synchronous multi-processor system on a chip ("SoC"), the method comprising:
   monitoring temperature readings uniquely associated with each of a plurality of individual processing components in the multi-processor SoC, wherein the plurality of processing components share a common power supply voltage and clock generator frequency;
   monitoring at least one thermal parameter of the portable computing device at various locations of the portable computing device external to the plurality of processing components, wherein the at least one thermal parameter of the portable computing device includes a skin temperature of the portable computing device;
   generating an alarm in response to the monitored thermal parameter of the portable computing device exceeding a predetermined threshold;
   in response to the alarm, sampling the monitored temperature readings uniquely associated with each of the processing components;
   based on the sampled temperature readings, querying performance data for each processing component, wherein the performance data represents the relationship between power consumption and workload processing capability for a given individual processing component when operating at a given temperature;
   comparing the performance data for each processing component to identify a least energy efficient processing component in the multi-processor SoC; and
   reallocating a first workload from the least energy efficient processing component to a more energy efficient processing component, wherein reallocating the first workload operates to reduce the power consumption by the least energy efficient processing component.

2. The method of claim 1, wherein the least energy efficient processing component is the processing component consuming the most amount of power per workload processed.

3. The method of claim 1, further comprising:
   determining that the alarm has not cleared;
   resampling the monitored temperature readings uniquely associated with each of the processing components;
   based on the resampled temperature readings, re-querying performance data for each processing component;
   comparing the re-queried performance data for each processing component to identify a new least energy efficient processing component; and
   reallocating a second workload from the least energy efficient processing component to a more energy efficient processing component, wherein reallocating the second workload operates to reduce the power consumption by the new least energy efficient processing component.

4. The method of claim 1, further comprising:
   determining that the alarm has cleared; and
   authorizing queued workloads to be scheduled to the least energy efficient processing component.

5. The method of claim 1, further comprising:
   transitioning a power mode of the least energy efficient processor from an active mode to an idle mode.

6. The method of claim 5, further comprising:
   determining that the alarm has cleared; and
   authorizing a return to an active power mode for the least energy efficient processor.

7. The method of claim 1, wherein the thermal parameter is associated with one of a package on package memory temperature, a junction temperature and a battery capacity.

8. The method of claim 1, wherein the portable computing device is in the form of a wireless telephone.

9. A computer system for managing thermal energy generation in a portable computing device having a synchronous multi-processor system on a chip ("SoC"), the system comprising:
   a hardware monitor module for:
      monitoring temperature readings uniquely associated with each of a plurality of individual processing components in the multi-processor SoC, wherein the plurality of individual processing components share a common power supply voltage and clock generator frequency;
      monitoring at least one thermal parameter of the portable computing device at various locations of the portable computing device external to the plurality of processing components, wherein the at least one thermal parameter of the portable computing device includes a skin temperature of the portable computing device;

generating an alarm in response to the monitored thermal parameter of the portable computing device exceeding a predetermined threshold; and in response to the alarm, sampling the monitored temperature readings uniquely associated with each of the processing components;

an hardware efficiency manager ("EM") module for:

based on the sampled temperature readings, querying performance data for each processing component, wherein the performance data represents the relationship between power consumption and workload processing capability for a given individual processing component when operating at a given temperature;

comparing the performance data for each processing component to identify a least energy efficient processing component in the multi-processor SoC; and reallocating a first workload from the least energy efficient processing component to a more energy efficient processing component, wherein reallocating the first workload operates to reduce the power consumption by the least energy efficient processing component.

10. The computer system of claim 9, wherein the least energy efficient processing component is the processing component consuming the most amount of power per workload processed.

11. The computer system of claim 9, wherein:

the hardware monitor module is further for:

determining that the alarm has not cleared; and resampling the monitored temperature readings uniquely associated with each of the processing components;

the hardware EM module is further for:

based on the resampled temperature readings, re-querying performance data for each processing component; and comparing the re-queried performance data for each processing component to identify a new least energy efficient processing component; and reallocating a second workload from the least energy efficient processing component to a more energy efficient processing component, wherein reallocating the second workload operates to reduce the power consumption by the new least energy efficient processing component.

12. The computer system of claim 9, wherein:

the hardware monitor module is further for:

determining that the alarm has cleared; and the hardware EM module is further for:

authorizing queued workloads to be scheduled to the least energy efficient processing component.

13. The computer system of claim 9, wherein:

the hardware monitor module is further for:

transitioning a power mode of the least energy efficient processor from an active mode to an idle mode.

14. The computer system of claim 13, wherein:

the hardware monitor module is further for:

determining that the alarm has cleared; and the EM module is further for:

authorizing a return to an active power mode for the least energy efficient processor.

15. The computer system of claim 9, wherein the thermal parameter is associated with one of a package on package memory temperature, a junction temperature and a battery capacity.

16. A computer system for managing thermal energy generation in a portable computing device having a synchronous multi-processor system on a chip ("SoC"), the system comprising:

hardware means for monitoring temperature readings uniquely associated with each of a plurality of individual processing components in the multi-processor SoC, wherein the plurality of individual processing components share a common power supply voltage and clock generator frequency;

hardware means for monitoring at least one thermal parameter of the portable computing device at various locations of the portable computing device external to the plurality of processing components, wherein the at least one thermal parameter of the portable computing device includes a skin temperature of the portable computing device;

hardware means for generating an alarm in response to the monitored thermal parameter of the portable computing device exceeding a predetermined threshold;

hardware means for sampling the monitored temperature readings uniquely associated with each of the processing components in response to the alarm;

based on the sampled temperature readings, hardware means for querying performance data for each processing component, wherein the performance data represents the relationship between power consumption and workload processing capability for a given individual processing component when operating at a given temperature;

hardware means for comparing the performance data for each processing component to identify a least energy efficient processing component in the multi-processor SoC; and hardware means for reallocating a first workload from the least energy efficient processing component to a more energy efficient processing component, wherein reallocating the first workload operates to reduce the power consumption by the least energy efficient processing component.

17. The computer system of claim 16, wherein the least energy efficient processing component is the processing component consuming the most amount of power per workload processed.

18. The computer system of claim 16, further comprising:

hardware means for determining that the alarm has not cleared;

hardware means for resampling the monitored temperature readings uniquely associated with each of the processing components;

hardware means for re-querying performance data for each processing component based on the resampled temperature readings;

hardware means for comparing the re-queried performance data for each processing component to identify a new least energy efficient processing component; and hardware means for reallocating a second workload from the least energy efficient processing component to a more energy efficient processing component, wherein reallocating the second workload operates to reduce the power consumption by the new least energy efficient processing component.

19. The computer system of claim 16, further comprising:
hardware means for determining that the alarm has cleared; and
hardware means for authorizing queued workloads to be scheduled to the least energy efficient processing component.

20. The computer system of claim 16, further comprising:
hardware means for transitioning a power mode of the least energy efficient processor from an active mode to an idle mode.

21. The computer system of claim 20, further comprising:
hardware means for determining that the alarm has cleared; and
hardware means for authorizing a return to an active power mode for the least energy efficient processor.

22. The computer system of claim 16, wherein the thermal parameter is associated with one of a package on package memory temperature, a junction temperature and a battery capacity.

23. The computer system of claim 16, wherein the portable computing device is in the form of a wireless telephone.

24. A computer program product comprising a non-transitory computer usable medium having a computer readable program code embodied therein, said computer readable program code adapted to be executed to implement a method for managing thermal energy generation in a portable computing device having a synchronous multi-processor system on a chip ("SoC"), said method comprising:
monitoring temperature readings uniquely associated with each of a plurality of individual processing components in the multi-processor SoC, wherein the plurality of individual processing components share a common power supply voltage and clock generator frequency;
monitoring at least one thermal parameter of the portable computing device at various locations of the portable computing device external to the plurality of processing components, wherein the at least one thermal parameter of the portable computing device includes a skin temperature of the portable computing device;
generating an alarm in response to the monitored thermal parameter of the portable computing device exceeding a predetermined threshold;
in response to the alarm, sampling the monitored temperature readings uniquely associated with each of the processing components;
based on the sampled temperature readings, querying performance data for each processing component, wherein the performance data represents the relationship between power consumption and workload processing capability for a given individual processing component when operating at a given temperature;
comparing the performance data for each processing component to identify a least energy efficient processing component in the multi-processor SoC; and
reallocating a first workload from the least energy efficient processing component to a more energy efficient processing component, wherein reallocating the first workload operates to reduce the power consumption by the least energy efficient processing component.

25. The computer program product of claim 24, wherein the least energy efficient processing component is the processing component consuming the most amount of power per workload processed.

26. The computer program product of claim 24, further comprising:
determining that the alarm has not cleared;
resampling the monitored temperature readings uniquely associated with each of the processing components;
based on the resampled temperature readings, re-querying performance data for each processing component;
comparing the re-queried performance data for each processing component to identify a new least energy efficient processing component; and
reallocating a second workload from the least energy efficient processing component to a more energy efficient processing component, wherein reallocating the second workload operates to reduce the power consumption by the new least energy efficient processing component.

27. The computer program product of claim 24, further comprising:
determining that the alarm has cleared; and
authorizing queued workloads to be scheduled to the least energy efficient processing component.

28. The computer program product of claim 24, further comprising:
transitioning a power mode of the least energy efficient processor from an active mode to an idle mode.

29. The computer program product of claim 28, further comprising:
determining that the alarm has cleared; and
authorizing a return to an active power mode for the least energy efficient processor.

30. The computer program product of claim 24, wherein the thermal parameter is associated with one of a package on package memory temperature, a junction temperature and a battery capacity.

* * * * *